United States Patent
Choi et al.

(10) Patent No.: US 9,401,022 B2
(45) Date of Patent: Jul. 26, 2016

(54) METHOD AND APPARATUS FOR GENERATING SPANNING TREE, METHOD AND APPARATUS FOR STEREO MATCHING, METHOD AND APPARATUS FOR UP-SAMPLING, AND METHOD AND APPARATUS FOR GENERATING REFERENCE PIXEL

(71) Applicant: Samsung Electronics Co., Ltd., Suwon-Si, Gyeonggi-Do (KR)

(72) Inventors: Ouk Choi, Yongin-si (KR); Dong Kyung Nam, Yongin-si (KR); Kee Chang Lee, Seongnam-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/513,559

(22) Filed: Oct. 14, 2014

(65) Prior Publication Data

US 2015/0332447 A1 Nov. 19, 2015

(30) Foreign Application Priority Data

May 13, 2014 (KR) ........................ 10-2014-0057176

(51) Int. Cl.
 *G06K 9/46* (2006.01)
 *G06T 7/00* (2006.01)
 *G06T 3/40* (2006.01)

(52) U.S. Cl.
 CPC ............... *G06T 7/003* (2013.01); *G06T 3/4007* (2013.01); *G06T 7/0026* (2013.01);
 (Continued)

(58) Field of Classification Search
 CPC ..... G06T 7/003; G06T 3/4007; G06T 7/0026; G06T 2207/10021; G06T 2200/04; G06T 7/0075; G06T 7/0022; H04N 13/0239; H04N 2013/0081

USPC ......... 382/154, 173, 225, 240, 107, 195, 226, 382/190, 236, 199, 219; 375/240.16, 375/240.12, E7.105, E7.243, E7.102, 375/E7.211, E7.123, E7.027, 240.25; 348/208.6, 155, 699, E5/066, 208.99, 348/143
 See application file for complete search history.

(56) References Cited

U.S. PATENT DOCUMENTS

| | | | |
|---|---|---|---|
| 7,046,840 B2 * | 5/2006 | Chang ................... | G06T 7/0075 345/420 |
| 7,257,249 B2 * | 8/2007 | Farsaie ............... | H04N 13/0221 345/419 |

(Continued)

FOREIGN PATENT DOCUMENTS

| KR | 10-1997-0072054 B1 | 7/1999 |
|---|---|---|
| KR | 10-2005-0103940 A | 5/2007 |

(Continued)

OTHER PUBLICATIONS

Qingxiong Yang: "A non-local cost aggregation method for stereo matching", Computer Vision and Pattern Recognition (CVPR), 2012 IEEE Conference on, IEEE, Jun. 16, 2012, pp. 1402-1409, XP032232226, DOI: 10.1109/CVPR.2012.6247827, ISBN: 978-1-4673-1226-4.

(Continued)

*Primary Examiner* — Sheela C Chawan
(74) *Attorney, Agent, or Firm* — Harness, Dickey & Pierce, P.L.C.

(57) ABSTRACT

A method and apparatus for generating a spanning tree, a method and apparatus for stereo matching, a method and apparatus for up-sampling, and a method and apparatus for generating a reference pixel are disclosed, in which a spanning tree may be generated by reference pixels, stereo matching or up-sampling may be performed based on the generated spanning tree, and a reference pixel may be generated based on a stereo video.

20 Claims, 29 Drawing Sheets

(52) U.S. Cl.
CPC .......... *G06T 7/0075* (2013.01); *G06T 2200/04* (2013.01); *G06T 2207/10012* (2013.01); *G06T 2207/10021* (2013.01); *G06T 2207/20072* (2013.01)

(56) References Cited

U.S. PATENT DOCUMENTS

| | | | | |
|---|---|---|---|---|
| 7,397,929 | B2* | 7/2008 | Nichani | G01V 8/10 |
| | | | | 382/103 |
| 8,184,913 | B2 | 5/2012 | Baker et al. | |
| 8,200,032 | B2* | 6/2012 | Wu | H04N 19/176 |
| | | | | 348/452 |
| 8,428,384 | B2* | 4/2013 | Bae | G06K 9/469 |
| | | | | 382/162 |
| 8,548,226 | B2* | 10/2013 | Sakano | G06T 7/0075 |
| | | | | 382/104 |
| 8,655,054 | B2* | 2/2014 | Chen | G06K 9/00201 |
| | | | | 382/154 |
| 2001/0026633 | A1 | 10/2001 | Abdel-Mottaleb et al. | |
| 2005/0138008 | A1 | 6/2005 | Tsillas | |
| 2005/0203927 | A1* | 9/2005 | Sull | G06F 17/30858 |
| 2006/0002612 | A1 | 1/2006 | Vigouroux et al. | |
| 2010/0189320 | A1 | 7/2010 | Dewaele | |
| 2013/0110820 | A1 | 5/2013 | Gupta et al. | |

FOREIGN PATENT DOCUMENTS

| | | |
|---|---|---|
| KR | 10-2008-0080001 A | 2/2010 |
| KR | 10-2013-0094626 A | 8/2013 |
| KR | 10-2013-0129725 A | 11/2013 |
| KR | 10-2013-0013138 A | 12/2013 |

OTHER PUBLICATIONS

Liu Ming-Yu et al: "Joint Geodesic Upsampling of Depth Images", IEEE Computer Society, US, Jun. 23, 2013, pp. 169-176, XP032493198, ISSN: 1063-6919, DOI: 10.1109/CVPR.2013.29 [retrieved on Oct. 2, 2013].

Jan Fischer et al: "Combination of Time-of Flight Depth and Stereo using Semiglobal Optimization", Robotics and Automation (ICRA), 2011 IEEE International Conference on, IEEE, May 9, 2011, pp. 3548-3553, XP032033860, DOI: 10.1109/ICRA.2011.5979999, ISBN: 978-1-61284-386-5.

Mei Xing et al: "Segment-Tree based Cost Aggregation for Stereo Matching", IEEE Computer Society Conference on Computer Vision and Pattern Recognition. Proceedings, IEEE Computer Society, US, Jun. 23, 2013, pp. 313-320, XP032493084, ISSN: 1063-6919, DOI: 10.1109/CVPR.2013.47 [retrieved on Oct. 2, 2013].

Extended European Search Report dated Oct. 27, 2015.

* cited by examiner

FIG. 6

| Order | Edge | Order | Edge |
|---|---|---|---|
| 1 | 11 — 15 | 13 | 10 — 14 |
| 2 | 1 — 2 | 14 | 3 — 7 |
| 3 | 8 — 12 | 15 | 4 — 8 |
| 4 | 7 — 8 | 16 | 14 — 15 |
| 5 | 2 — 6 | 17 | 9 — 10 |
| 6 | 10 — 11 | 18 | 11 — 12 |
| 7 | 15 — 16 | 19 | 13 — 14 |
| 8 | 9 — 13 | 20 | 2 — 3 |
| 9 | 5 — 9 | 21 | 12 — 16 |
| 10 | 1 — 5 | 22 | 7 — 11 |
| 11 | 3 — 4 | 23 | 6 — 10 |
| 12 | 5 — 6 | 24 | 6 — 7 |

FIG. 10

| Order | Edge |
|---|---|
| 1 | 4 — 12 |
| 2 | 5 — 13 |
| 3 | 11 — 13 |
| 4 | 4 — 5 |
| 5 | 12 — 13 |
| 6 | 5 — 11 |
| 7 | 5 — 12 |
| 8 | 11 — 12 |
| 9 | 4 — 13 |
| 10 | 4 — 11 |

1400

METHOD AND APPARATUS FOR GENERATING SPANNING TREE, METHOD AND APPARATUS FOR STEREO MATCHING, METHOD AND APPARATUS FOR UP-SAMPLING, AND METHOD AND APPARATUS FOR GENERATING REFERENCE PIXEL

CROSS-REFERENCE TO RELATED APPLICATION

This application claims the priority benefit of Korean Patent Application No. 10-2014-0057176, filed on May 13, 2014, in the Korean Intellectual Property Office, the entire disclosure of which is incorporated herein by reference.

BACKGROUND

1. Field

Example embodiments of the following description relate to a method and an apparatus for generating a spanning tree, a method and an apparatus for stereo matching, a method and an apparatus for up-sampling, and a method and an apparatus for generating a reference pixel.

2. Description of the Related Art

In general, computer vision refers to technology for acquiring information through use of an image. For example, technology for acquiring distance information through use of an image is referred to as stereo vision.

In stereo matching of a stereo system in which two cameras are disposed in parallel, detecting corresponding points between a left image and a right image is performed. To detect most similar corresponding points, a method for stereo matching may conduct a comparison on all pixels of the right image to pixels of the left image, respectively. Through this, a distance may be determined through the obtained corresponding points.

SUMMARY

The foregoing and/or other aspects are achieved by providing a method of generating a spanning tree, the method including receiving information associated with reference pixels for an input image, and generating the spanning tree that connects general pixels and the reference pixels included in the input image based on the information. The reference pixels may further include additional information when compared to general pixels included in the input image.

Each of the general pixels may include at least one of intensity information and position information. The additional information may include at least one of disparity information and depth information.

The spanning tree may include a minimum spanning tree (MST) that connects the general pixels and the reference pixels included in the input image. The spanning tree may include a plurality of sub-trees, wherein each of the plurality of sub-trees comprises pixels having a degree of correlation.

The generating of the spanning tree may include generating sub-trees to allow the reference pixels to be root nodes, and connecting the sub-trees by adjusting edge costs amongst the sub-trees.

The foregoing and/or other aspects are achieved by providing a method for stereo matching, the method including receiving a first input image and a second input image for stereo matching, obtaining a spanning tree that connects pixels included in the first input image, calculating accumulated data costs corresponding to a plurality of candidate disparities for one of the pixels based on data costs of general pixels from among the pixels, data costs of reference pixels from among the pixels, and edge costs of edges included in the spanning tree, and determining one of the plurality of candidate disparities to be a disparity of the one of the pixels by comparing the accumulated data costs.

The foregoing and/or other aspects are achieved by providing a method for up-sampling, the method including obtaining a spanning tree that connects pixels included in an input image, calculating accumulated data costs corresponding to a plurality of candidate depths for one of the pixels based on data costs of reference pixels from among the pixels and edge costs of edges included in the spanning tree, and determining one of the plurality of candidate depths to be a depth of the one of the pixels by comparing the accumulated data costs.

The foregoing and/or other aspects are achieved by providing a method of generating a reference pixel, the method including tracking a first image sequence and a second image sequence included in a stereo video, and generating reference pixels for a current frame based on a result of the tracking of the first image sequence, a result of the tracking of the second image sequence, and a result of stereo matching in a previous frame.

The foregoing and/or other aspects are achieved by providing an apparatus for generating a spanning tree, the apparatus including a receiver to receive information associated with reference pixels for an input image, and a generator to generate the spanning tree that connects general pixels and the reference pixels included in the input image based on the information.

The foregoing and/or other aspects are achieved by providing an apparatus for stereo matching, the apparatus including a receiver to receive a first input image and a second input image for stereo matching, an obtainer to obtain a spanning tree that connects pixels included in the first input image, a calculator to calculate accumulated data costs corresponding to a plurality of candidate disparities for one of the pixels based on data costs of general pixels from among the pixels, data costs of reference pixels from among the pixels, and edge costs of edges included in the spanning tree, and a determiner to determine one of the plurality of candidate disparities to be a disparity of the one of the pixels by comparing the accumulated data costs.

The foregoing and/or other aspects are achieved by providing an apparatus for up-sampling, the apparatus including an obtainer to obtain a spanning tree that connects pixels included in an input image, a calculator to calculate accumulated data costs corresponding to a plurality of candidate depths for one of the pixels based on data costs of reference pixels from among the pixels and edge costs of edges included in the spanning tree, and a determiner to determine one of the plurality of candidate depths to be a depth of the one of the pixels by comparing the accumulated data costs.

The foregoing and/or other aspects are achieved by providing an apparatus for generating a reference pixel, the apparatus including a tracker to track a first image sequence and a second image sequence included in a stereo video, and a generator to generate reference pixels for a current frame based on a result of the tracking of the first image sequence, a result of the tracking of the second image sequence, and a result of stereo matching in a previous frame.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 4 through 16 illustrate generation of a spanning tree using a reference pixel according to example embodiments;

DETAILED DESCRIPTION

Figure 1:
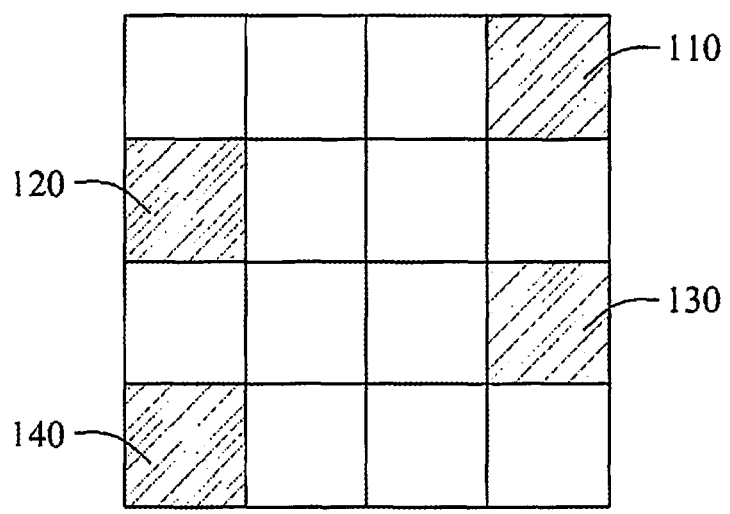
FIG. 1 illustrates a reference pixel according to example embodiments.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., a 3D display device). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s). Example embodiments of the following disclosure may find various applications in processing of a stereo image, a multi-view image, a light field image, or a depth image, and be employed in three-dimensional (3D) modeling or a user interface.

Reference Pixel According to Example Embodiments

FIG. 1 illustrates a reference pixel according to example embodiments. Referring to FIG. 1, an image 100 includes a plurality of pixels. The plurality of pixels may include information representing the image 100. For example, the information representing the image 100 may be intensity information. When the image 100 is a color image, each of the plurality of pixels may include (R, G, B) information.

Each of the plurality of pixels included in the image 100 may be identified by coordinates in the image 100, and indicated by a unique index.

For example, when the image 100 includes pixels in a form of a 4×4 matrix, a pixel disposed at a first column of a first row is indicated by an index "1", a pixel disposed at a second column of the first row is indicated by an index "2", a pixel disposed at a third column of the first row is indicated by an index "3", and a pixel disposed at a fourth column of the first row is indicated by an index "4". A pixel disposed at the first column of a second row is indicated by an index "5", a pixel disposed at a second column of the second row is indicated by an index "6", a pixel disposed at a third column of the second row is indicated by an index "7", and a pixel disposed at a fourth column of the second row is indicated by an index "8". In this example, a pixel disposed at a fourth column of a fourth row is indicated by an index "16".

Coordinates of a corresponding pixel may be simply substituted for an index indicating a predetermined and/or selected pixel because the index indicating the predetermined and/or selected pixel corresponds to the coordinates of the corresponding pixel in a one-to-one relationship. In this sense, the plurality of pixels included in the image 100 may include position information.

A portion of the plurality of pixels included in the image 100 may further include additional information when compared to a remainder of the plurality of pixels. For example, a pixel 110, a pixel 120, a pixel 130, and a pixel 140 may further include additional information when compared to the other remaining pixels. In the following descriptions herein, unless otherwise indicated, a pixel including general information associated with an image is referred to as a general pixel, and a pixel further including additional information when compared to the general pixel is referred to as a reference pixel. In this example, the general information may include intensity information and position information.

The additional information may be information additionally representing the image 100 disposed at a reference pixel in the image 100. For example, the pixel 110, the pixel 120, the pixel 130, and the pixel 140 may be reference pixels included in the image 100, and further include depth information and disparity information when compared to general pixels. Further descriptions pertaining to the depth information and the disparity information will be provided in greater detail with reference to the following example embodiments.

Additional information corresponding to a position of a reference pixel may be predetermined and/or selected in various manners. As an example, the additional information may be calculated by performing a more precise and complex algorithm corresponding to the position of the reference pixel. As another example, the additional information may be obtained by extracting a result with a relatively high reliability from among results of calculating an algorithm of greater efficiency. As still another example, the additional information may be obtained using a sensor to measure additional information corresponding to a position of a reference pixel. As further another example, when an image corresponds to any one of a plurality of frames in series, the additional information may be estimated based on information on a previous frame.

The additional information included in the reference pixel may be adopted in processing of the image 100. As will be described later, additional information corresponding to a position of a general pixel may be generated based on the additional information included in the reference pixel. For example, stereo matching may be performed using the reference pixel, or up-sampling of a depth image may be performed using the reference pixel. Further descriptions pertaining to the stereo matching and the up-sampling of the depth image will be provided in greater detail with reference to the following example embodiments.

Figure 2:
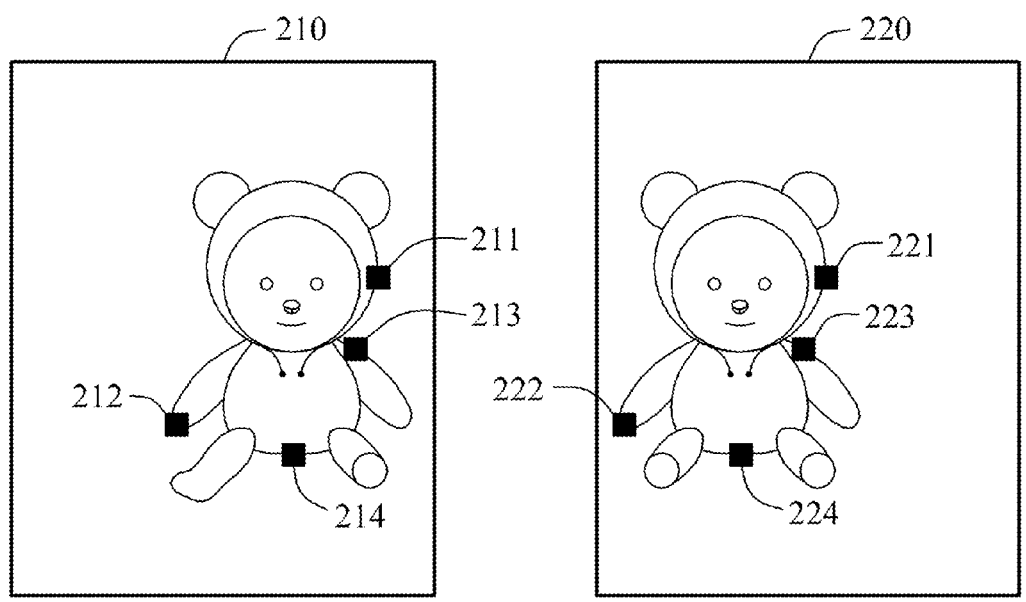
FIG. 2 illustrates reference pixels including disparity information according to example embodiments

FIG. 2 illustrates reference pixels including disparity information according to example embodiments. Referring to FIG. 2, an image 200 is a stereo image. The image 200 includes a first image 210 corresponding to a left eye and a second image 220 corresponding to a right eye.

The image 200 may be generated by a stereo camera. The stereo camera may include two cameras spaced apart by a predetermined and/or desired distance in parallel, such as both eyes of a person. The two cameras may photograph an identical scene or an identical object simultaneously. A camera corresponding to a left eye may generate the first image 210 corresponding to the left eye, and a camera corresponding to a right eye may generate the second image 220 corresponding to the right eye.

In this example, additional information corresponding to a position of a portion of a plurality of pixels included in the first image 210 and the second image 220 may be pre-provided. As previously described, a portion of pixels provided with additional information is referred to as a reference pixel. For example, the first image 210 includes a reference pixel 211, a reference pixel 212, a reference pixel 213, and a reference pixel 214. The second image 220 includes a reference pixel 221, a reference pixel 222, a reference pixel 223, and a reference pixel 224.

The reference pixels included in the first image 210 and the second image 220 may each include disparity information. The disparity information may refer to information indicating a degree of binocular disparity. For ease of understanding of the disparity information, brief description of a method for stereo matching will be discussed from among methods of processing a stereo image.

The method for stereo matching may refer to a method of matching an image corresponding to a left eye and an image corresponding to a right eye. At least a portion of pixels included in the image corresponding to the left eye may match at least a portion of pixels included in the image corresponding to the right eye because the image corresponding to the left eye and the image corresponding to the right eye are obtained by simultaneously photographing the identical scene or the identical object. For example, two matching pixels may correspond to an identical point of a real scene or a real object.

When a stereo image is assumed to be generated by two cameras disposed in parallel, two matching pixels may have an identical coordinate value in a y axis direction, and a different coordinate value in an x axis direction. In this example, a difference between x axis coordinate values of the two matching pixels may indicate a degree of binocular disparity.

The reference pixel 211 included in the first image 210 matches the reference pixel 221 included in the second image 220. In this example, disparity information of the reference pixel 211 may be a value obtained by subtracting an x axis coordinate value of the reference pixel 221 from an x axis coordinate value of the reference pixel 211. Disparity information of the reference pixel 221 may be a value obtained by subtracting the x axis coordinate value of the reference pixel 211 from the x axis coordinate value of the reference pixel 221.

The reference pixel 212, the reference pixel 213, and the reference pixel 214 included in the first image 210 may match the reference pixel 222, the reference pixel 223, and the reference pixel 224 included in the second image 220. In this example, the reference pixel 212, the reference pixel 213, and the reference pixel 214 may each include disparity information. The reference pixel 222, the reference pixel 223, and the reference pixel 224 may each include disparity information.

As will be described later, disparity information corresponding to a position of a general pixel may be generated based on the disparity information included in the reference pixel. For example, stereo matching may be performed using the reference pixel. Concisely, a plurality of pieces of candidate disparity information corresponding to a predetermined and/or selected general pixel may exist, and disparity information of the corresponding general pixel may be determined using a reference pixel from among the plurality of pieces of candidate disparity information.

Figure 3:
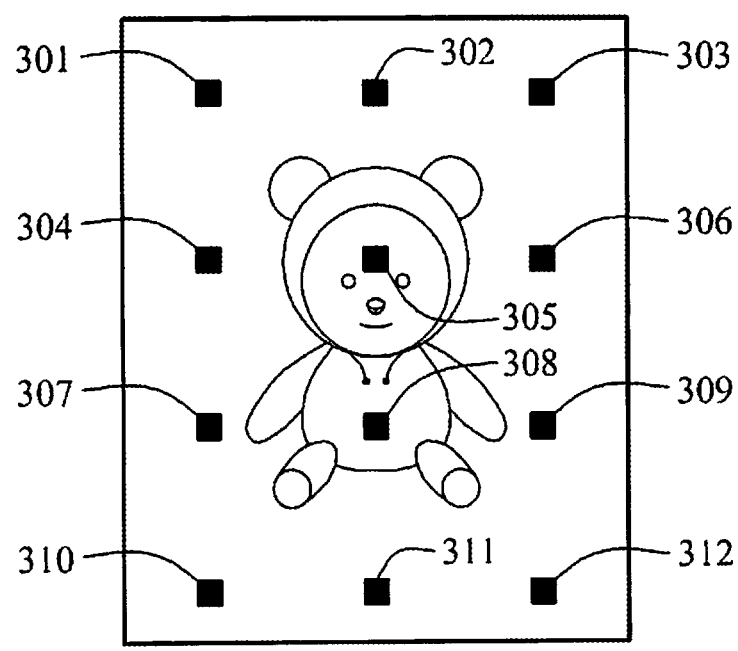
FIG. 3 illustrates reference pixels including depth information according to example embodiments.

FIG. 3 illustrates reference pixels including depth information according to example embodiments. Referring to FIG. 3, an image 300 is an image obtained by combining a high resolution color image and a low resolution depth image. The depth image may be generated by a depth camera. A plurality of pixels included in the depth image may include depth information.

The depth information may include a distance between the depth camera and an object photographed by the depth camera. The plurality of pixels included in the depth image may correspond to differing points of the object. Depth information of a predetermined and/or selected pixel may be a distance between a point corresponding to the pixel and the depth camera.

When the high resolution color image and the low resolution depth image are combined, the plurality of pixels included in the depth image may correspond to a portion of a plurality of pixels included in the color image. In this example, depth information corresponding to a position of the portion of the plurality of pixels included in the color image may be provided by the depth image.

For example, depth information corresponding to positions of a portion of pixels 301, 302, 303, 304, 305, 306, 307, 308, 309, 310, 311, and 312 from among a plurality of pixels included in the image 300 may be provided by the depth image. In this example, the portion of pixels 301, 302, 303, 304, 305, 306, 307, 308, 309, 310, 311, and 312 may be reference pixels because the portion of pixels 301, 302, 303, 304, 305, 306, 307, 308, 309, 310, 311, and 312 further includes the depth information when compared to a remainder of the pixels.

As will be described later, depth information corresponding to a position of a general pixel may be generated based on the depth information included in the reference pixel. For example, up-sampling of the depth image may be performed using the reference pixel. Concisely, a plurality of pieces of candidate depth information may exist corresponding to a predetermined and/or selected general pixel, and depth information of the corresponding general pixel may be determined using a reference pixel from among the plurality of pieces of candidate depth information.

Spanning Tree According to Example Embodiments

Hereinafter, descriptions pertaining to a method of processing an image using a reference pixel according to example embodiments will be provided. Referring to FIG. 1, the pixel 110, the pixel 120, the pixel 130, and the pixel 140 included in the image 100 may further include additional information. According to example embodiments, a spanning tree may be generated to generate additional information corresponding to a position of a general pixel using additional information included in a reference pixel. The spanning tree may refer to a portion of a connected, undirected graph, and a tree that connects all nodes of the connected, undirected graph.

As will be described later, the generated spanning tree may be used to rapidly and precisely propagate the additional information included in the reference pixel to the general pixel. Reliable additional information included in the reference pixel may be propagated to calculate unknown additional information corresponding to the position of the general pixel because the additional information included in the reference pixel is pre-provided reliable information. In the following descriptions herein, unless otherwise indicated, a reference pixel is referred to as a ground control point (gcp), and a general pixel is referred to as a non-ground control point (non-gcp).

The generated spanning tree may be a minimum spanning tree (MST). For example, a plurality of spanning trees may exist in a single graph. The MST may refer to a spanning tree having a minimum cost from among the plurality of spanning trees when a cost is given to each edge of the graph. Also, the MST may be referred to as a minimum cost spanning tree.

A method of generating a spanning tree according to example embodiments may be performed over two operations. For example, a plurality of sub-trees may be generated, and a spanning tree may be generated using the plurality of sub-trees.

For ease of description, it is assumed that general information included in a general pixel is intensity information, and additional information further included in a reference pixel is disparity information. However, it should be understood that these example embodiments are not construed as limited to the above instance, and may include an instance in which the general pixel or the reference pixel includes other information.

Sub-trees may be generated based on an algorithm represented by Table 1. An input of the algorithm of Table 1 may include an input image and "gcps" for the input image. An output of the algorithm of Table 1 may include a plurality of sub-trees.

TABLE 1

1. Construct a graph on an image by connecting all neighboring pixels with edges with weights $|I_u - I_v|$.
2. Sort the edges in ascending order of their weights.
3. Visiting the edges do the following
   1. If one of root(u) and root(v) is a gcp
      If $|I_u - I_v| < \min(Th/(u), Th(v))$, join u and v, and set the parent node to the gcp. Update Th.
   2. If none of root(u) and root(v) is a gcp
      If $|I_u - I_v| < \min(Th(u), Th(v))$, join u and v, and set the parent node so that the level of the tree will be lower. Update Th.
   3. If both of root(u) and root(v) are gcps
      Do not join the tree.

As a result, a set of subtrees with their roots either gcps or non-gcps are constructed.

In Table 1, $I_u$ denotes intensity information of a pixel "u", and $I_v$ denotes intensity information of a pixel "v". A weight denotes a cost of an edge. Root(u) denotes a root node of a sub-tree to which the pixel "u" belongs, and root(v) denotes a root node of a sub-tree to which the pixel "v" belongs. Th(u) denotes a threshold cost of the sub-tree to which the pixel "u" belongs, and Th(v) denotes a threshold cost of the sub-tree to which the pixel "v" belongs. The threshold cost may be predetermined and/or selected. For example, a threshold cost may be set equally for all sub-trees. Alternatively, a threshold cost may be set differently for each of the sub-trees based on a type of a root node of a corresponding sub-tree.

Each of the generated sub-trees may be classified as a single area connected to a corresponding root. When a root node of a predetermined and/or selected sub-tree is a "gcp", the root node of the corresponding sub-tree may include intensity information, position information, and disparity information. When a root node of a predetermined and/or selected sub-tree is a "non-gcp", the root node of the corresponding sub-tree may include intensity information and position information. Information included in the root node of the predetermined and/or selected sub-tree may be used as information that represents the corresponding sub-tree.

An MST may be generated based on an algorithm represented by Table 2. An input of the algorithm of Table 2 may include an input image, "gcps" for the input image, and the plurality of sub-trees generated based on the algorithm of Table 1. An output of the algorithm of Table 2 may be an MST that covers a whole of the input image.

TABLE 2

1. Calculate weights for edges between roots of subtrees.
2. Sort the edges in ascending order of their weights.
3. Visiting edges, do the following
    1. If the edge connects two gcp-rooted subtrees
        If $|I_u - I_v| < \min(Th(u), Th(v))$ and/or $|d_u - d_v| <$
        $\min(Th_d(u), Th_d(v))$, join the subtrees, and set the parent node so that the level of the tree will be lower.
        Otherwise, join the subtrees, and penalize the edge weight with a value T.
    2. If the edge connects heterogeneous subtrees or non-gcp-rooted subtrees
        Join the subtrees, and penalize the weight with a value T.

As a result, a minimum spanning tree is constructed.

In Table 2, du denotes disparity information of the pixel "u", and dv denotes disparity information of the pixel "v". Thd(u) denotes a disparity information threshold cost of the sub-tree to which the pixel "u" belongs, and Thd(v) denotes a disparity information threshold cost of the sub-tree to which the pixel "v" belongs.

Figure 4:
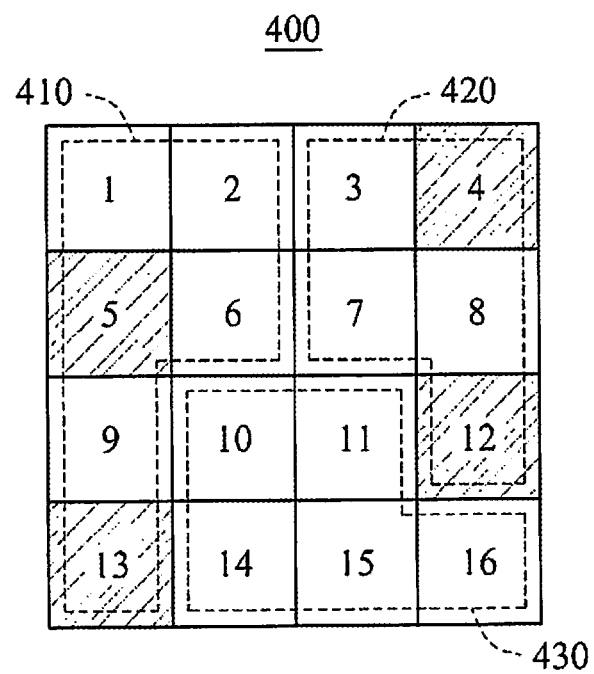

Hereinafter, further descriptions pertaining to the algorithm of Table 1 and the algorithm of Table 2 will be provided in greater detail referring to FIGS. 4 through 16. Referring to FIG. 4, an image 400 according to example embodiments includes pixels in a form of a 4×4 matrix. As previously described, each of the pixels included in the image 400 may be indicated by a unique index. In the following descriptions herein, unless otherwise indicated, a pixel "idx", being a positive integer, may refer to a pixel indicated by an index "idx".

For example, a pixel 4, a pixel 5, a pixel 12, and a pixel 13 from among the pixels included in the input image 400 may be reference pixels, and a remainder of the pixels may be general pixels. The input image 400 may be largely divided into three areas. For example, the input image 400 may include a first object corresponding to a first area 410 and a second object corresponding to a second area 420. A third area 430 may correspond to a background.

Figure 5:
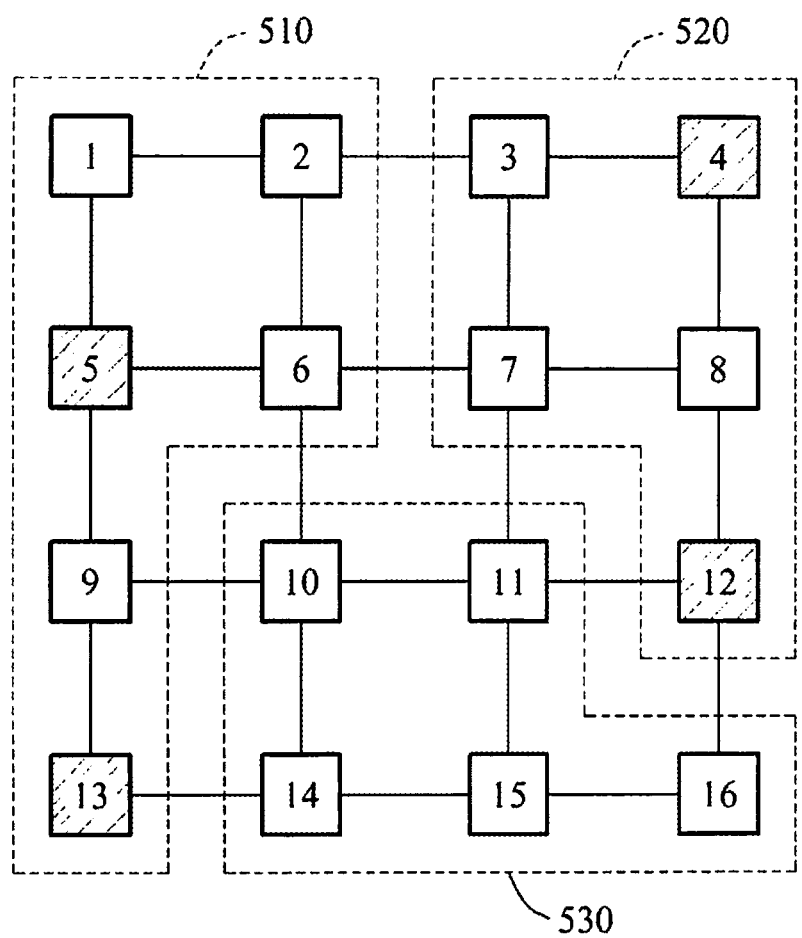

Referring to FIG. 5, a graph 500 according to example embodiments may be a graph including nodes corresponding to the pixels included in the input image 400 of FIG. 4. In step 1 of the algorithm of Table 1, neighboring pixels in the graph 500 may be connected to one another. The neighboring pixels may be determined in various manners.

For example, neighboring pixels of a predetermined and/or selected pixel may be determined to be up, down, left, and right neighboring pixels with the corresponding pixel. Alternatively, neighboring pixels of a predetermined and/or selected pixel may be determined to be up, down, left, right, or diagonal neighboring pixels with the corresponding pixel. Still alternatively, neighboring pixels of a predetermined and/or selected pixel may be determined to be all remaining pixels aside from the corresponding pixel. Hereinafter, for ease of description, it is assumed that the neighboring pixels of the predetermined and/or selected pixel are up, down, left, and right neighboring pixels with the corresponding pixel.

In step 1 of the algorithm of Table 1, a cost amongst the neighboring pixels in the graph 500 may be calculated. The cost amongst the neighboring pixels is calculated in various manners. For example, the cost amongst the neighboring pixels may be calculated based on intensity information of the neighboring pixels. Alternatively, the cost amongst the neighboring pixels may be calculated based on intensity information and position information of the neighboring pixels. Hereinafter, for ease of description, it is assumed that the cost amongst the neighboring pixels is calculated to be an absolute value of an intensity difference amongst the neighboring pixels.

Pixels included in the graph 500 may be largely divided into three areas. For example, a first area 510 may correspond to the first area 410 of FIG. 4, a second area 520 may correspond to the second area 420 of FIG. 4, and a third area 530 may correspond to the third area 430 of FIG. 4.

A cost amongst neighboring pixels belonging to the same area may be lower than a cost amongst neighboring pixels belonging to differing areas. Referring to FIG. 6, in step 2 of the algorithm of Table 1, edges included in the graph 500 may be sorted in an ascending order of a cost. For example, a cost of an edge connecting a pixel 11 and a pixel 15 may be lowest, and a cost of an edge connecting a pixel 6 and a pixel 7 may be highest from among edges included in the graph 500.

Figure 7:
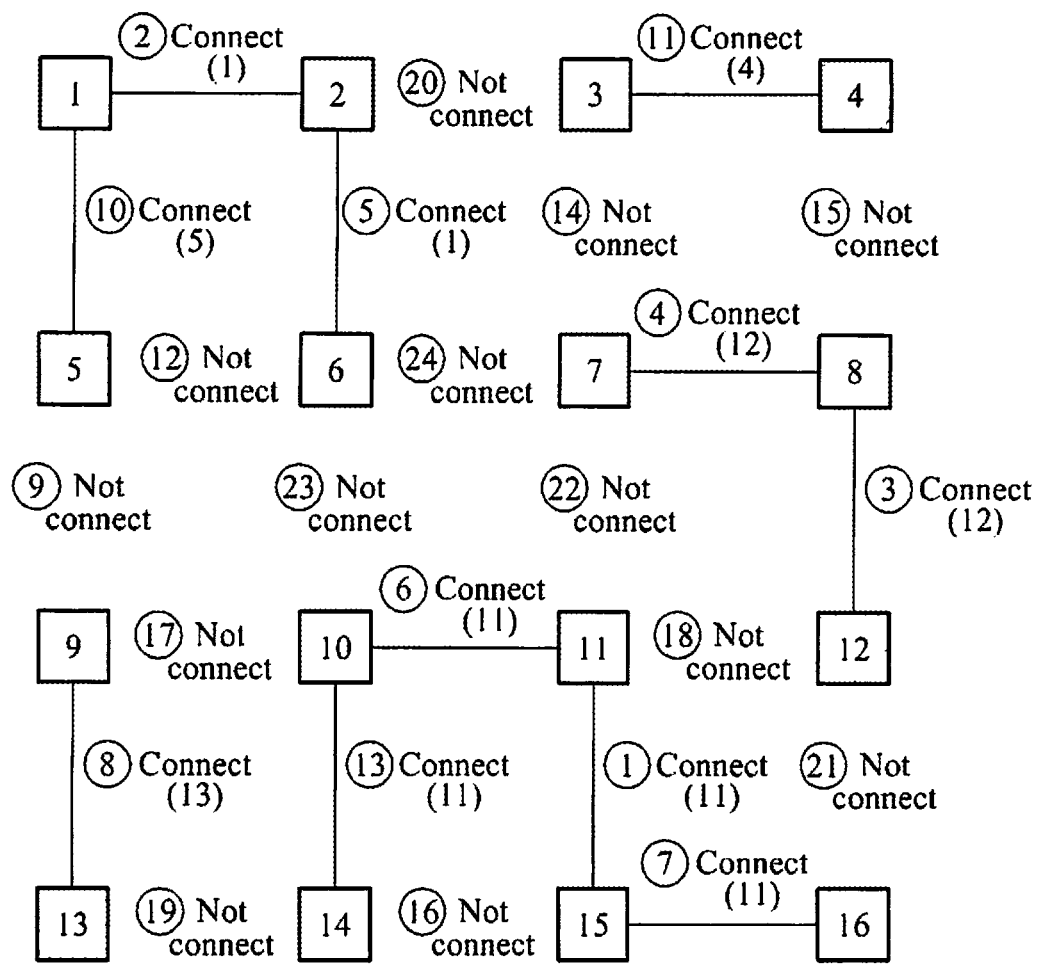

Referring to FIG. 7, in step 3 of the algorithm of Table 1, the edges are visited as sorted in the ascending order. For example, the edge connecting the pixel 11 and the pixel 15 may be visited first. In step 3-2 of the algorithm of Table 1, an edge cost and a threshold cost may be compared because the pixel 11 and the pixel 15 are both "non-gcps". In the following descriptions herein, unless otherwise indicated, the edge cost may refer to a cost amongst neighboring pixels, and the threshold cost may refer to a relatively low threshold cost from among threshold costs of a sub-tree to which each of the neighboring pixels belongs.

Hereinafter, for ease of description, it is assumed that a cost amongst neighboring pixels belonging to the same area is lower than a threshold cost, and a cost amongst neighboring pixels belonging to differing areas is higher than a threshold value. In step 3-2 of the algorithm of Table 1, the pixel 11 and the pixel 15 may be connected because the pixel 11 and the pixel 15 belong to the same area 530.

When neighboring pixels are connected, a threshold cost of a sub-tree to be generated may be updated. For example, the threshold cost of the sub-tree to be generated may be updated based on a threshold cost of each of the neighboring pixels prior to the connection. However, descriptions pertaining to the updating of the threshold cost will be omitted hereinafter because it is assumed that a cost amongst neighboring pixels belonging to the same area is lower than a threshold cost, and a cost amongst neighboring pixels belonging to differing areas is higher than a threshold cost.

When all neighboring pixels are "non-gcps", a root node may be selected to allow a level of a sub-tree to be generated to be lower subsequent to being connected. When the level of the sub-tree to be generated is identical for any one selected from among the neighboring pixels, a pixel having a smaller index or a pixel having a greater index may be selected, or any one pixel may be arbitrarily selected. Hereinafter, for ease of description, it is assumed that a pixel having a smaller index is selected when the level of the sub-tree to be generated is identical for any one selected from among the neighboring pixels. In this example, the pixel 11 may be selected to be a root node.

An edge connecting a pixel 1 and a pixel 2 may be visited. In step 3-2 of the algorithm of Table 1, an edge cost and a threshold cost may be compared because the pixel 1 and the pixel 2 are both "non-gcps". In step 3-2 of the algorithm of Table 1, the pixel 1 and the pixel 2 may be connected because the pixel 1 and the pixel 2 belong to the same area 510. The pixel 1 may be selected to be a root node because the level of the sub-tree to be generated is identical for any one selected from among the neighboring pixels.

An edge connecting a pixel 8 and the pixel 12 may be visited. In step 3-1 of the algorithm of Table 1, an edge cost and a threshold cost may be compared because the pixel 8 is a "non-gcp" and the pixel 12 is a "gcp". In step 3-1 of the algorithm of Table 1, the pixel 8 and the pixel 12 may be connected because the pixel 8 and the pixel 12 belong to the same area 520. When one of the neighboring pixels is a "gcp", the "gcp" pixel may be selected to be a root node of a sub-tree to be generated. In this example, the pixel 12 may be selected to be the root node.

An edge connecting the pixel 7 and the pixel 8 may be visited. In step 3-1 of the algorithm of Table 1, an edge cost and a threshold cost may be compared because the pixel 7 is a "non-gcp" and the pixel 12, for example, the root node of the sub-tree to which the pixel 8 belongs is a "gcp". In step 3-1 of the algorithm of Table 1, the pixel 7 and the pixel 8 may be connected because the pixel 7 and the pixel 8 belong to the same area 520. The pixel 12 may be selected to be a root node because the pixel 12, for example, the root node of the sub-tree to which the pixel 8 belongs is a "gcp".

An edge connecting the pixel 2 and the pixel 6 may be visited. In step 3-2 of the algorithm of Table 1, an edge cost and a threshold cost may be compared because the pixel 1, for example, a root node of a sub-tree to which the pixel 2 belongs is a "non-gcp" and the pixel 6 is a "non-gcp". In step 3-2 of the algorithm of Table 1, the pixel 2 and the pixel 6 may be connected because the pixel 2 and the pixel 6 belong to the same area 510. The pixel 1 having a smaller index may be selected to be a root node because a level of a sub-tree to be generated is identical for any one selected from the pixel 1, for example, the root node of the sub-tree to which the pixel 2 belongs and the pixel 6.

An edge connecting a pixel 10 and the pixel 11 may be visited. In step 3-2 of the algorithm of Table 1, an edge cost and a threshold cost may be compared because the pixel 10 is a "non-gcp" and the pixel 11, for example, a root node of a sub-tree to which the pixel 11 belongs is a "non-gcp". In step 3-2 of the algorithm of Table 1, the pixel 10 and the pixel 11 may be connected because the pixel 10 and the pixel 11 belong to the same area 530. The pixel 11 may be selected to be a root node because a level of a sub-tree to be generated is lower when the pixel 11, for example, the root node of a sub-tree to which the pixel 11 belongs is selected to be the root node.

An edge connecting the pixel 15 and a pixel 16 may be visited. In step 3-2 of the algorithm of Table 1, an edge cost and a threshold cost may be compared because the pixel 11, for example, a root node of a sub-tree to which the pixel 15 belongs is a "non-gcp" and the pixel 16 is a "non-gcp". In step 3-2 of the algorithm of Table 1, the pixel 15 and the pixel 16 may be connected because the pixel 15 and the pixel 16 belong to the same area 530. The pixel 11 may be selected to be a root node because a level of a sub-tree to be generated is lower than the level of the sub-tree to be generated by selecting the pixel 16 to be the root node.

An edge connecting the pixel 9 and the pixel 13 may be visited. In step 3-1 of the algorithm of Table 1, an edge cost and a threshold cost may be compared because the pixel 9 is a "non-gcp" and the pixel 13 is a "gcp". In step 3-1 of the algorithm of Table 1, the pixel 9 and the pixel 13 may be connected because the pixel 9 and the pixel 13 belong to the same area 510. The pixel 13 may be selected to be a root node because the pixel 13 is a "gcp".

An edge connecting the pixel 5 and the pixel 9 may be visited. In step 3-3 of the algorithm of Table 1, the pixel 5 and the pixel 9 may not be connected because the pixel 5 is a "gcp" and the pixel 13, for example, a root node of a sub-tree to which the pixel 9 belongs is a "gcp".

An edge connecting the pixel 1 and the pixel 5 may be visited. In step 3-1 of the algorithm of Table 1, an edge cost and a threshold cost may be compared because the pixel 1, for example, a root node of a sub-tree to which the pixel 1 belongs is a "non-gcp" and the pixel 5 is a "gcp". In step 3-1 of the algorithm of Table 1, the pixel 1 and the pixel 5 may be connected because the pixel 1 and the pixel 5 belong to the same area 510. The pixel 5 may be selected to be a root node because the pixel 5 is a "gcp".

An edge connecting a pixel 3 and the pixel 4 may be visited. In step 3-1 of the algorithm of Table 1, an edge cost and a threshold cost may be compared because the pixel 3 is a "non-gcp" and the pixel 4 is a "gcp". In step 3-1 of the algorithm of Table 1, the pixel 3 and the pixel 4 may be connected because the pixel 3 and the pixel 4 belong to the same area 520. The pixel 4 may be selected to be a root node because the pixel 4 is a "gcp".

An edge connecting the pixel 5 and the pixel 6 may be visited. The pixel 5 and the pixel 6 may not be connected because the pixel 5 and the pixel 6 belong to the same sub-tree. A requirement may include a spanning tree corresponding to a tree which does not have a cyclic path.

An edge connecting the pixel 10 and a pixel 14 may be visited. In step 3-2 of the algorithm of Table 1, an edge cost and a threshold cost may be compared because the pixel 11, for example, a root node of a sub-tree to which the pixel 10 belongs is a "non-gcp" and the pixel 14 is a "non-gcp". In step 3-2 of the algorithm of Table 1, the pixel 10 and the pixel 14 may be connected because the pixel 10 and the pixel 14 belong to the same area 530. The pixel 11 may be selected to be a root node because a level of a sub-tree to be generated is lower than the level of the sub-tree to be generated by selecting the pixel 14 to be the root node.

An edge connecting the pixel 3 and the pixel 7 may be visited. In step 3-3 of the algorithm of Table 1, the pixel 3 and the pixel 7 may not be connected because the pixel 4, for example, a root node of a sub-tree to which the pixel 3 belongs is a "gcp" and the pixel 12, for example, a root node of a sub-tree to which the pixel 7 belongs is a "gcp".

An edge connecting the pixel 4 and the pixel 8 may be visited. In step 3-3 of the algorithm of Table 1, the pixel 4 and the pixel 8 may not be connected because the pixel 4, for example, a root node of a sub-tree to which the pixel 4 belongs is a "gcp" and the pixel 12, for example, a root node of a sub-tree to which the pixel 8 belongs is a "gcp".

An edge connecting the pixel 14 and the pixel 15 may be visited. The pixel 14 and the pixel 15 may not be connected because the pixel 14 and the pixel 15 belong to the same sub-tree.

An edge connecting the pixel 9 and the pixel 10 may be visited. In step 3-1 of the algorithm of Table 1, an edge cost and a threshold cost may be compared because the pixel 13, for example, a root node of a sub-tree to which the pixel 9 belongs is a "gcp" and the pixel 11, for example, a root node of a sub-tree to which the pixel 10 belongs is a "non-gcp". In step 3-1 of the algorithm of Table 1, the pixel 9 and the pixel 10 may not be connected because the pixel 9 belongs to the first area 510 and the pixel 10 belong to the third area 530.

Figure 8:
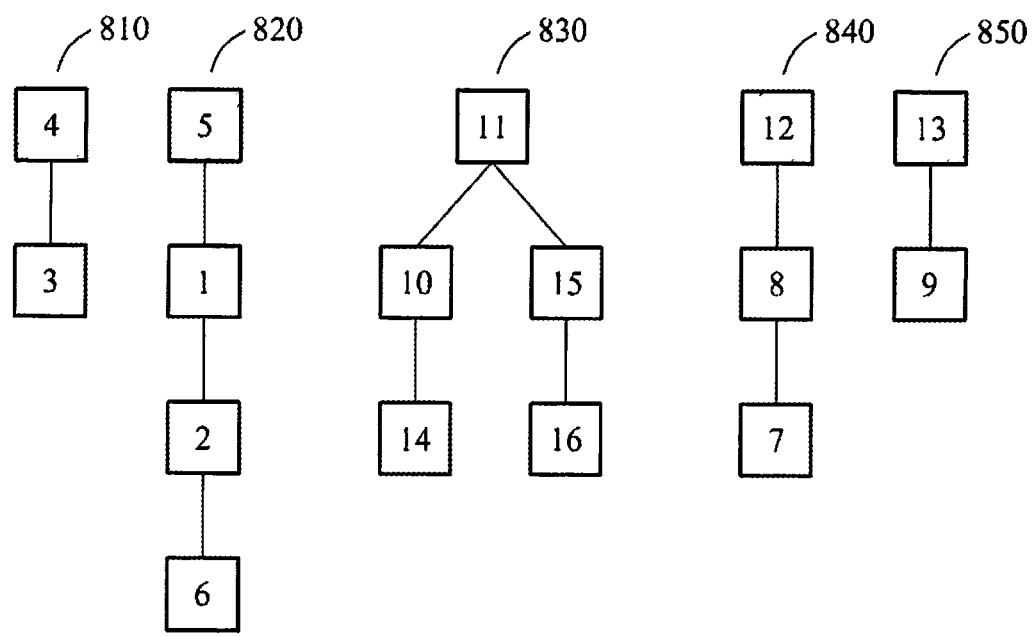

Edges to be visited subsequently may not be connected because all costs of the edges to be visited subsequently are higher than threshold costs. Referring to FIG. 8, five sub-trees 810, 820, 830, 840, and 850 are generated as a result of performing the algorithm of Table 1.

Figure 9:
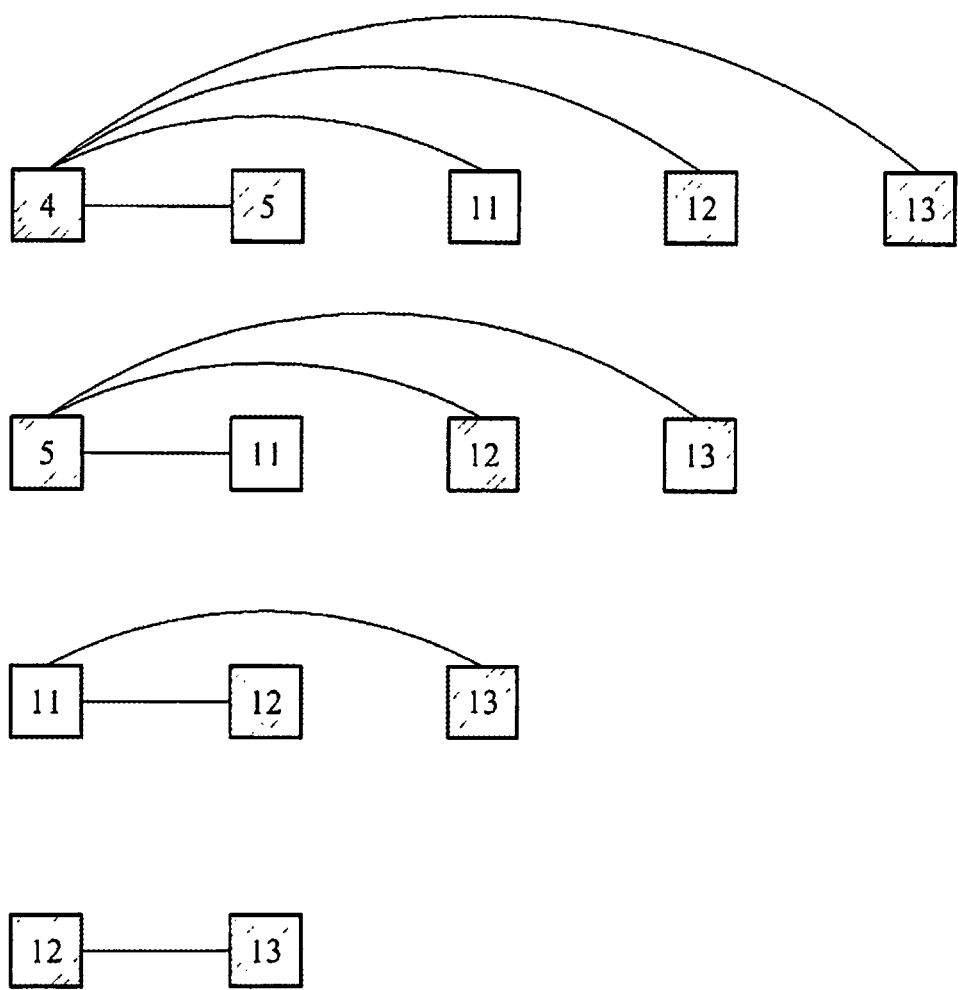

Referring to FIG. 9, in step 1 of the algorithm of Table 2, costs for edges between root nodes are calculated. For example, costs for edges between neighboring root nodes may be calculated, or costs for all edges between any root nodes may be calculated. Hereinafter, descriptions pertaining to the calculating of the costs for all of the edges between any root nodes will be provided. A k-dimensional (k-d) tree may be used to visit an edge between non-neighboring root nodes.

Costs for edges between root nodes may be calculated in various manners. For example, a cost between a "gcp" root node and a "gcp" root node may be calculated based on at least one of intensity information, position information, and disparity information. A cost between a "non-gcp" root node and a "gcp" root node may be calculated based on at least one of intensity information and position information. A cost between a "non-gcp" root node and a "non-gcp" root node may be calculated based on at least one of intensity information and position information.

Referring to FIG. 10, in step 2 of the algorithm of Table 2, edges between root nodes may be sorted in an ascending order of a cost. For example, a cost between a pixel 4, for example, a root node of the first sub-tree 810 and a pixel 12, for example, a root node of the fourth sub-tree 840 may be lowest. A cost between the pixel 4, for example, the root node of the first sub-tree 810 and a pixel 11, for example, a root node of the third sub-tree 830 may be highest.

Figure 11:
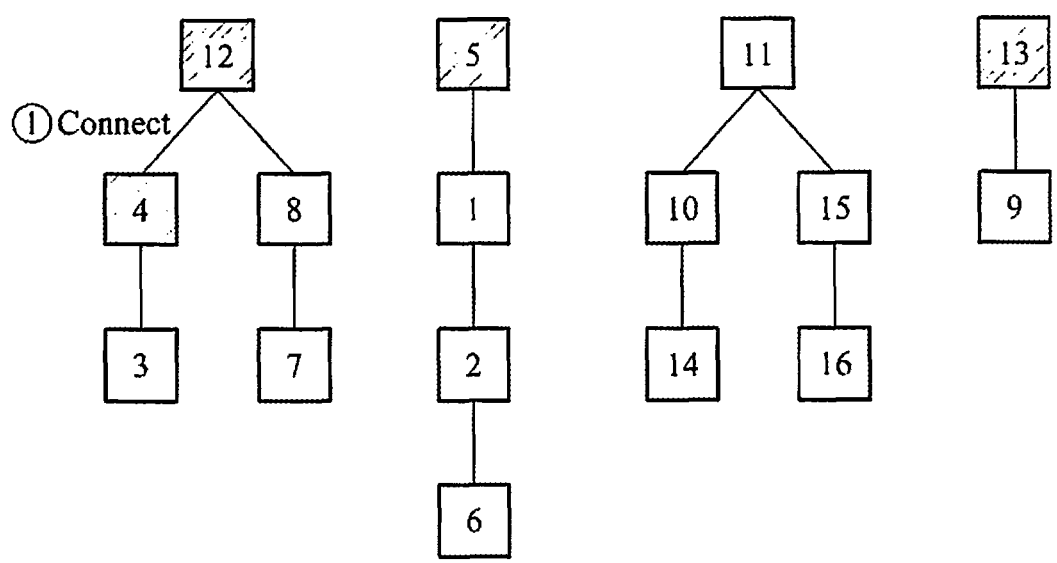

Referring to FIG. 11, in step 3 of the algorithm of Table 2, edges may be visited as sorted in the ascending order. For example, an edge connecting a pixel 4 and a pixel 12 may be visited first. In step 3-1 of the algorithm of Table 2, an edge cost and a threshold cost may be compared because the pixel 4 and the pixel 12 are both "gcps". In the following descriptions herein, unless otherwise indicated, the edge cost may refer to a cost of a visited edge, and the threshold cost may refer to a relatively low threshold cost between threshold costs of sub-trees to which the root nodes belong, respectively. The edge cost and the threshold cost may be associated with at least one of intensity information, position information, and disparity information.

Hereinafter, for ease of description, it is assumed that a cost between root nodes belonging to the same area is lower than a threshold cost, and a cost between root nodes belonging to differing areas is higher than a threshold value. In step 3-1 of the algorithm of Table 2, the pixel 4 and the pixel 12 may be connected because the pixel 4 and the pixel 12 belong to the same area 520. The pixel 12 may be selected to be a root node because a level of a sub-tree to be generated is lower when the pixel 12 is selected to be the root node.

Figure 12:
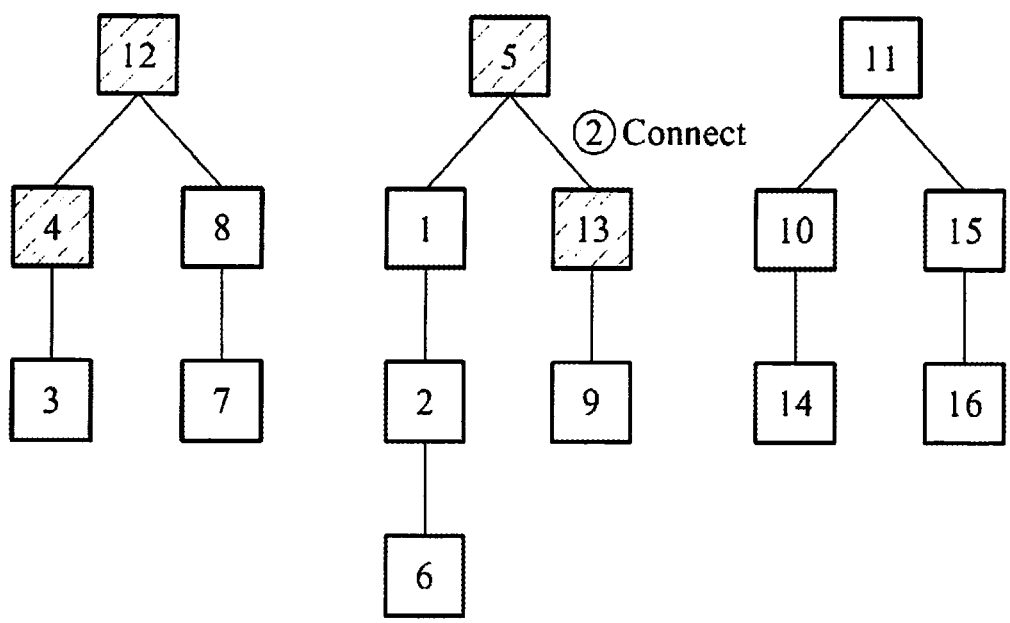

Referring to FIG. 12, an edge connecting a pixel 5 and a pixel 13 may be visited. In step 3-1 of the algorithm of Table 2, an edge cost and a threshold cost may be compared because the pixel 5 and the pixel 13 are both "gcps". In step 3-1 of the algorithm of Table 2, the pixel 5 and the pixel 13 may be connected because the pixel 5 and the pixel 13 belong to the same area 510. The pixel 5 may be selected to be a root node because a level of a sub-tree to be generated is lower when the pixel 5 is selected to be the root node.

An edge connecting a pixel 11 and the pixel 13 may be visited. However, the pixel 11 and the pixel 13 may not be connected because the pixel 13 is no longer a root node. An edge connecting a pixel 4 and the pixel 5 are visited. However, the pixel 4 and the pixel 5 may not be connected because the pixel 4 is no longer a root node. An edge connecting a pixel 12 and the pixel 13 may be visited. However, the pixel 12 and the pixel 13 may not be connected because the pixel 13 is no longer a root node.

Figure 13:
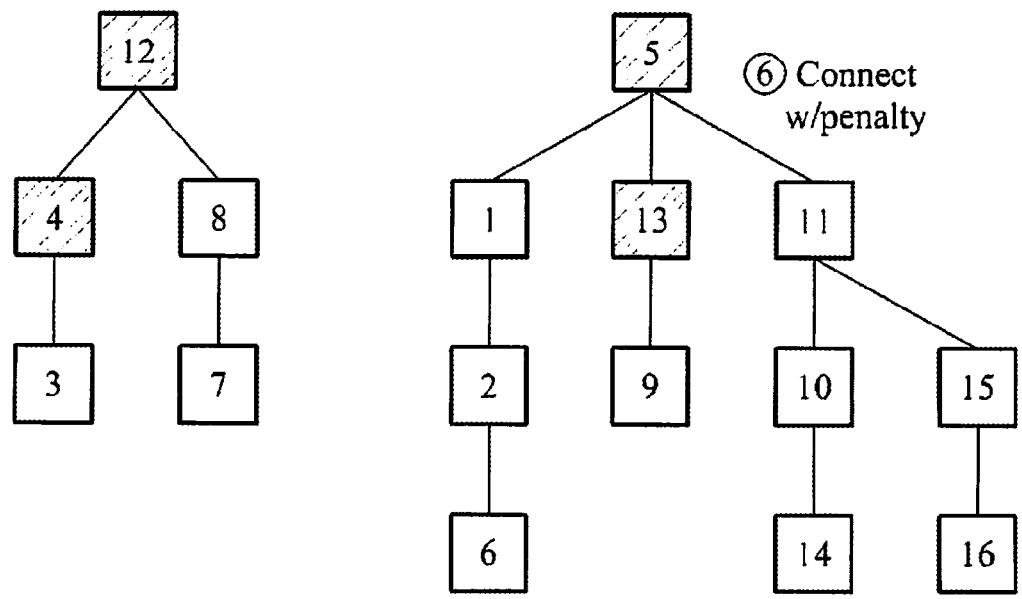

Referring to FIG. 13, an edge connecting a pixel 5 and a pixel 11 may be visited. In step 3-2 of the algorithm of Table 2, the pixel 5 and the pixel 11 may be connected because the pixel 5 is a "gcp" and the pixel 11 is a "non-gcp". In step 3-2 of the algorithm of Table 2, an edge cost and a threshold cost need not be compared, and a cost of the edge connecting the pixel 5 and the pixel 11 may be penalized because a sub-tree having a "gcp" root and a sub-tree having a "non-gcp" root belong to differing areas based on a result of performing the algorithm of Table 1. The pixel 5 may be selected to be a root node because a level of a sub-tree to be generated is lower when the pixel 5 is selected to be the root node.

Figure 14:
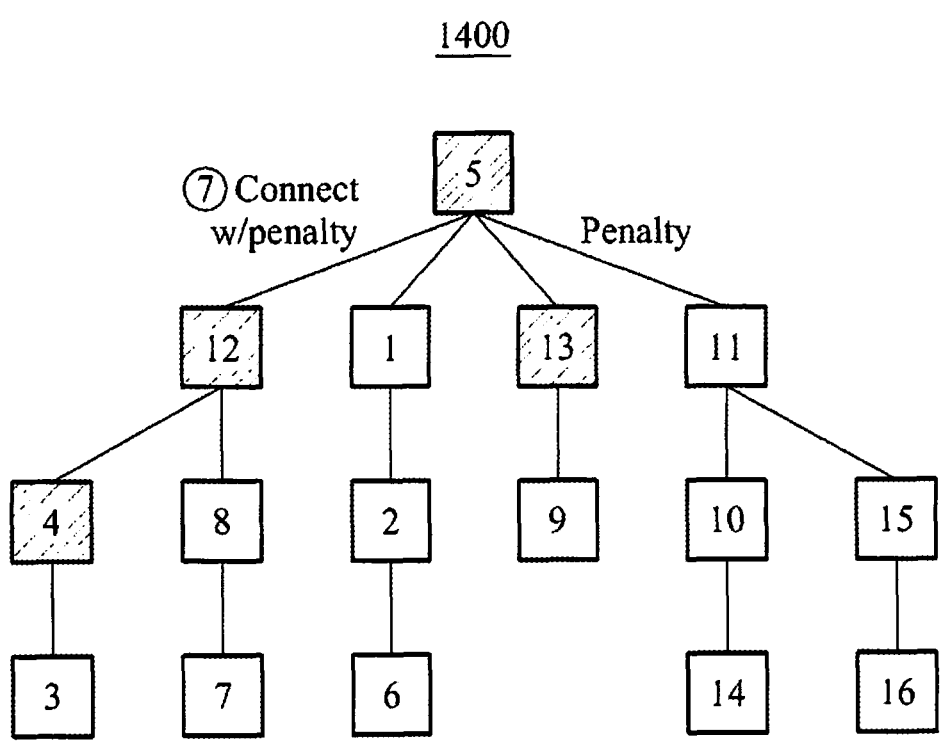

Referring to FIG. 14, an edge connecting a pixel 5 and a pixel 12 may be visited. In step 3-1 of the algorithm of Table 2, an edge cost and a threshold cost may be compared because the pixel 5 and the pixel 12 are both "gcps". In step 3-1 of the algorithm of Table 2, a cost of the edge connecting the pixel 5 and the pixel 12 may be penalized because the pixel 5 belongs to the first area 510 and the pixel 12 belongs to the second area 520. The pixel 5 may be selected to be a root node because a level of a sub-tree to be generated is lower when the pixel 5 is selected to be the root node.

Figure 15:
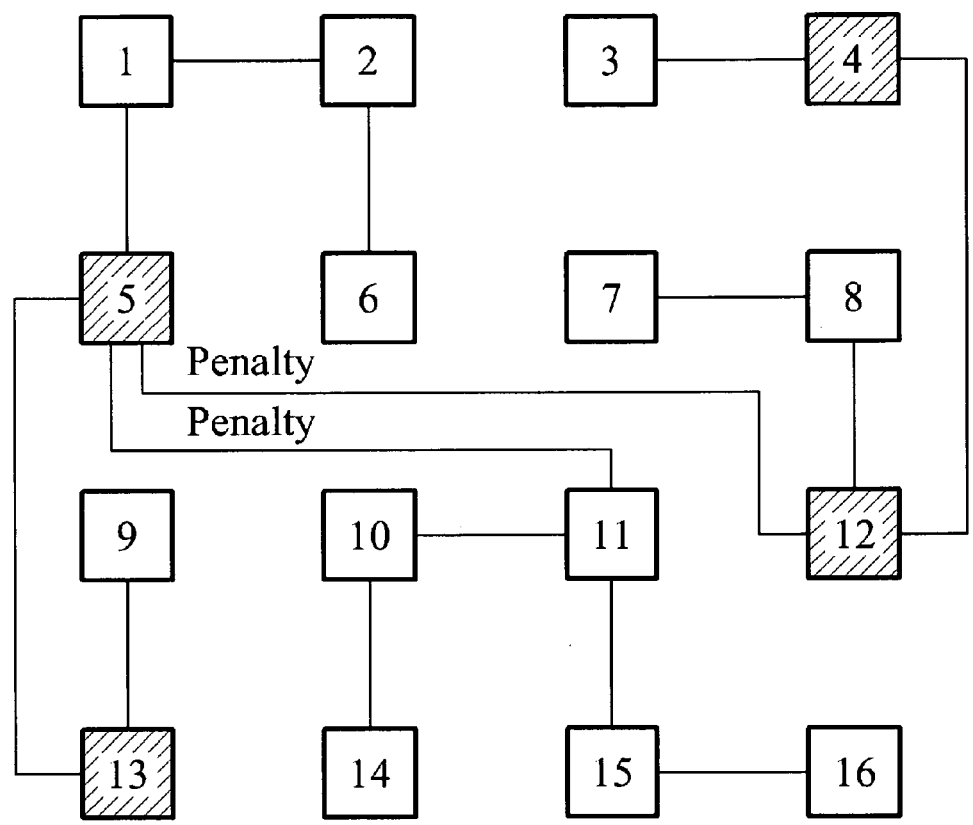

Referring to FIG. 15, a spanning tree 1500 is generated as a result of performing the algorithm of Table 2. The spanning tree 1500 corresponds to a tree 1400 of FIG. 14.

Figure 16:
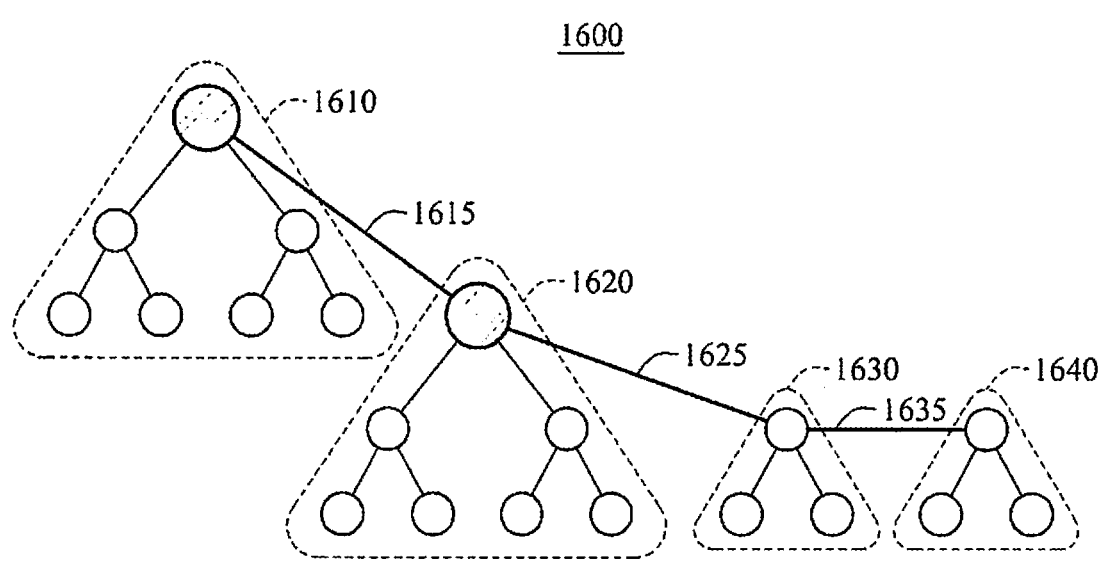

Hereinafter, descriptions pertaining to a process of performing the algorithm of Table 1 and the algorithm of Table 2 will be provided referring to FIG. 16. A first sub-tree 1610, a second sub-tree 1620, a third sub-tree 1630, and a fourth sub-tree 1640 may be generated based on the algorithm of Table 1. In this example, the sub-trees may be generated to allow a single sub-tree to include, at most, a single "gcp".

Root nodes of the sub-trees may be connected based on the algorithm of Table 2. In this example, a cost of an edge, for example, an edge 1615, connecting a "gcp" and a "gcp" may be calculated based on at least one of intensity information, position information, and disparity information. For example, the cost of the edge connecting a "gcp" and a "gcp" may be calculated based on any one of Equation 1, Equation 2, Equation 3, Equation 4, Equation 5, and Equation 6. Also, various modifications may be made to a manner of calculating the cost of the edge connecting a "gcp" and a "gcp".

$$\sqrt{\alpha^2(x_u-x_v)^2+\beta^2(d_u-d_v)^2+\gamma^2(I_u-I_v)^2}$$ [Equation 1]

$$\alpha|X_u-X_v|+\beta|d_u-d_v|+\gamma|I_u-I_v|$$ [Equation 2]

$$\sqrt{\beta^2(d_u-d_v)^2+\gamma^2(I_u-I_v)^2}$$ [Equation 3]

$$\beta|d_u-d_v|+\gamma|I_u-I_v| \qquad \text{[Equation 4]}$$

$$\beta|d_u-d_v| \qquad \text{[Equation 5]}$$

$$\gamma|I_u-I_v| \qquad \text{[Equation 6]}$$

In Equations 1 through 6, $x_u$ denotes position information of a pixel u, $x_v$ denotes position information of a pixel v, and α denotes a parameter for position information. $d_u$ denotes disparity information of the pixel u, $d_v$ denotes disparity information of the pixel v, and 13 denotes a parameter for disparity information. $I_u$ denotes intensity information of the pixel u, $I_v$ denotes intensity information of the pixel v, and γ denotes a parameter for intensity information.

When the cost of the edge 1615 is higher than a threshold value, the cost of the edge 1615 may be penalized.

A cost of an edge, for example, an edge 1625, connecting a "gcp" and a "non-gcp" may be calculated based on at least one of intensity information and position information because a "non-gcp" does not include disparity information. In this example, the cost of the edge 1625 may be penalized. For example, the cost of the edge connecting a "gcp" and a "non-gcp" may be calculated based on Equation 7. Also, various modifications may be made to a manner of calculating the cost of the edge connecting a "gcp" and a "non-gcp".

$$\gamma|I_u-I_v|+T \qquad \text{[Equation 7]}$$

In Equation 7, T denotes a penalty. A cost of an edge, for example, an edge 1635, connecting a "non-gcp" and a "non-gcp" may be calculated based on at least one of intensity information and position information because a "non-gcp" does not include disparity information. In this example, the cost of the edge 1635 may be penalized. For example, the cost of the edge connecting a "non-gcp" and a "non-gcp" may be calculated based on Equation 7. Also, various modifications may be made to a manner of calculating the cost of the edge connecting a "non-gcp" and a "non-gcp".

Stereo Matching According to Example Embodiments

Hereinafter, descriptions pertaining to a method for stereo matching using a spanning tree will be provided referring to FIGS. 17 and 18. As previously described, the method for stereo matching may refer to a method of matching a pixel in an image corresponding to a right eye and a pixel in an image corresponding to a left eye. The method for stereo matching may be performed based on the image corresponding to the left eye, or based on the image corresponding to the right eye. Hereinafter, for ease of description, it is assumed that the method for stereo matching is performed based on the image corresponding to the left eye.

Most appropriate candidate disparity information may be selected from among a plurality of pieces of candidate disparity information $\{0, \ldots, d_{max}\}$ to obtain disparity information of a predetermined and/or selected pixel x included in an image. A data cost corresponding to each candidate disparity information from among the set of candidate disparity information $d \in \{0, \ldots, d_{max}\}$ in the pixel x may be calculated to select the most appropriate candidate disparity information.

Referring to Equation 8, a pixel group $\{x'\}$ includes pixels of an image corresponding to a right eye that are likely to match the pixel x of an image corresponding to a left eye.

$$\{x'\}=\{x':x'=x-d, y'=y, d\in\{0,\ldots,d_{max}\}\} \qquad \text{[Equation 8]}$$

The data cost may be defined by a function that determines a similarity between the pixel x and the pixel group $\{x'\}$ as expressed by Equation 9.

$$D_x(d)=f(d;I_l,I_r,x,W) \qquad \text{[Equation 9]}$$

In Equation 9, $D_x(d)$ denotes a data cost corresponding to candidate disparity information d in the pixel x. $I_l$ denotes intensity information of a pixel of an image corresponding to a left eye, and $I_r$ denotes intensity information of a pixel of an image corresponding to a right eye. W denotes an area to be set to calculate a feature vector of the pixel x.

For example, the lower $D_x(d)$ to be output, the greater a similarity between a first feature vector determined by intensity information of a pixel (x, y) of Il and the area W neighboring the pixel (x, y) and a second feature vector determined by intensity information of a pixel (x-d, y) of Ir and an area W' neighboring the pixel (x-d, y). The greater a heterogeneity between the first feature vector and the second feature vector, the greater Dx(d) to be output.

For example, a data cost for stereo matching may be represented by Equation 10 and Equation 11.

$$D_v(d) := \mu D_v^{conventional}(d) + \kappa G_v(d) \qquad \text{[Equation 10]}$$

$$G_v(d) = \begin{cases} 0 & \text{if } d \approx d_v \\ G_{max} & \text{otherwise} \end{cases} \qquad \text{[Equation 11]}$$

In Equations 10 and 11, $D_v(d)$ denotes a data cost, $D_v^{conventional}(d)$ denotes a general data cost calculated based on intensity information, and $G_v(d)$ denotes a data cost for a "gcp". μ and κ denote parameters to determine weights of Dvconventional(d) and Gv(d), respectively. dv denotes disparity information pre-provided to a "gcp" pixel v. Gmax denotes a maximum value of a predetermined and/or selected data cost.

In an instance of a "gcp" pixel v1, κ may be set to be sufficiently greater than μ. For example, κ may be set to "1", and μ may be set to "0". When the candidate disparity information d is identical to the disparity information pre-provided to the pixel v1, a data cost may be a minimum value, for example, "0". When the candidate disparity information d differs from the disparity information pre-provided to the pixel v1, a data cost may be a maximum value, for example, Gmax.

In an instance of a "non-gcp" pixel v2, μ may be set to be sufficiently greater than κ. For example, μ may be set to "1", and κ may be set to "0". A data cost corresponding to the candidate disparity information d may be calculated using Dvconventional(d) because disparity information is not pre-provided to the "non-gcp" pixel v2.

An accumulated data cost may be used to enhance a performance of stereo matching. For example, a weighted sum of data costs of pixels included in a predetermined and/or selected area may be calculated based on Equation 12 in lieu of based on a single data cost Dx(d) to calculate a data cost of the pixel v.

$$\overline{D}_x(d) = \sum_{i \in R_x} w(i, x) D_i(d) \qquad \text{[Equation 12]}$$

In Equation 12, $\overline{D}_x(d)$ denotes an accumulated data cost corresponding to the candidate disparity information d in the pixel x. $R_x$ denotes a predetermined and/or selected area to calculate the accumulated data cost of the pixel x, and w(i, x) denotes a weight of a data cost of a pixel i to be added to calculate the accumulated data cost of the pixel x. $D_i(d)$ denotes a data cost corresponding to the candidate disparity information d in the pixel i included in $R_x$. $D_i(d)$ may be applied to Equation 10.

In this example, a coverage of the area $R_x$ and the weight w(x, i) for the weighted sum may be significant parameters to determine a performance of the accumulated data cost $\overline{D}_x(d)$. Referring to Equation 13, a weighted sum of data costs of pixels that cover an entire image may be calculated using a spanning tree according to example embodiments.

$$\overline{D}_v(d) = \sum_{u \in I} w(u, v) D_u(d) \qquad \text{[Equation 13]}$$

In Equation 13, $\overline{D}_v(d)$ denotes an accumulated data cost corresponding to the candidate disparity information d in the pixel v. I denotes a group of pixels that cover an entire image, and w(u, v) denotes a weight of a data cost of a pixel u to be added to calculate the accumulated data cost of the pixel v. $D_u(d)$ denotes a data cost corresponding to the candidate disparity information d in the pixel u included in I. $D_u(d)$ may be applied to Equation 10.

w(u, v) may be a geodesic distance between the pixel u and the pixel v. For example, w(u, v) may be calculated based on Equation 14.

$$w(u, v) = \qquad \text{[Equation 14]}$$

$$\exp\left(-\frac{\sum_{v \to u} edgestrength}{\gamma}\right) = \prod_{v \to u} \exp\left(-\frac{edgestrength}{\gamma}\right)$$

In Equation 14, $$\sum_{v \to u} edgestrength$$

denotes a value obtained by calculating a sum of costs of edges present along a path from the pixel v to the pixel u in the spanning tree. γ denotes a parameter for w(u, v).

Figure 17:
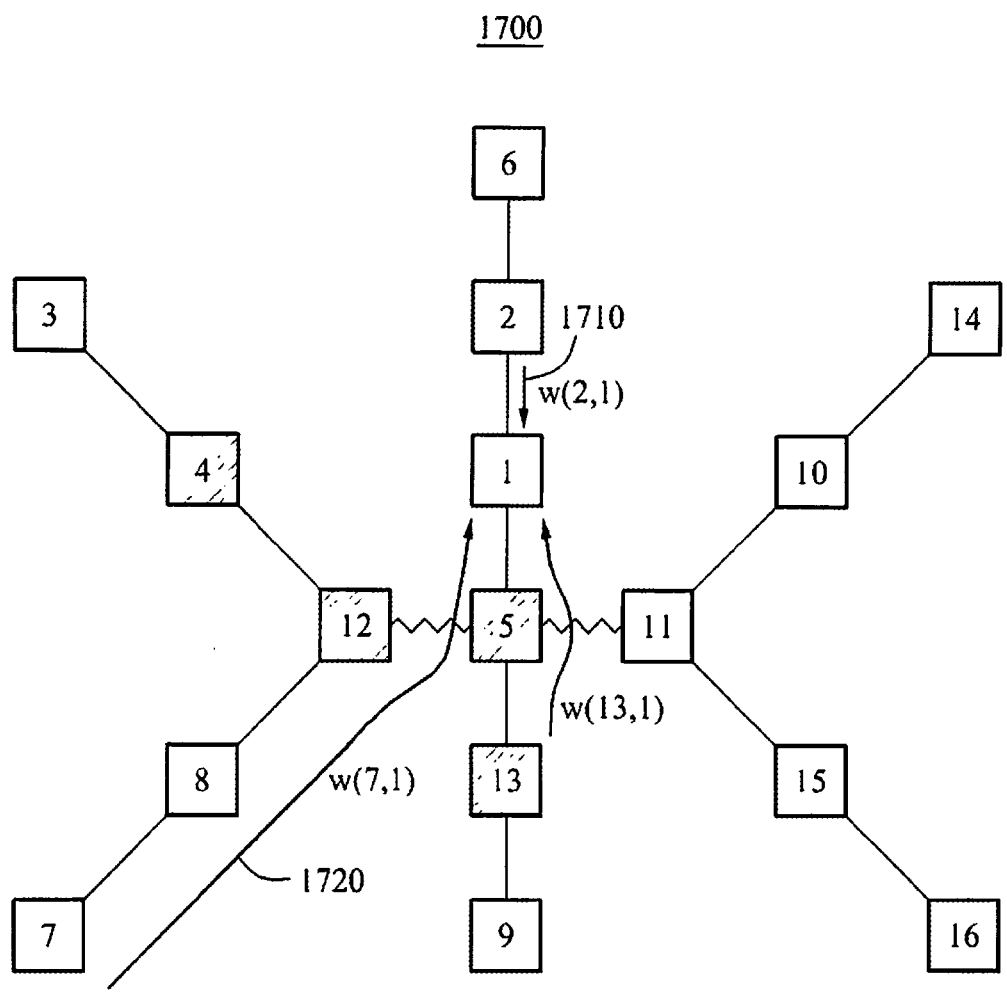
FIGS. 17 and 18 illustrate an operation of stereo matching or an operation of up-sampling using a spanning tree according to example embodiments.

For example, referring to FIG. 17, w(2, 1) is a sum of costs of edges present along a path 1710 from a pixel 2 to a pixel 1. w(7, 1) is a sum of costs of edges present along a path 1720 from a pixel 7 to the pixel 1. w(13, 1) is a sum of costs of edges present along a path 1730 from a pixel 13 to the pixel 1.

A value of w(u1, v) may decrease because the higher a similarity between a pixel u1 and the pixel v, the smaller a sum of costs of edges present along a path from the pixel u1 to the pixel v. Conversely, a value of w(u2, v) may increase because the lower a similarity between a pixel u2 and the pixel v, the higher a sum of costs of edges present along a path from the pixel u2 to the pixel v.

As an example, referring to FIG. 17, w(2, 1) may have a sufficiently smaller value than w(7, 1). By way of example, the cost of the edge present along the path 1710 from the pixel 2 to the pixel 1 may be sufficiently lower than the sum of the costs of the edges present along the path 1720 from the pixel 7 to the pixel 1. An edge connecting a pixel 12 and a pixel 5 exists along the path 1720 from the pixel 7 to the pixel 1 because the edge connecting the pixel 12 and the pixel 5 is an edge penalized when the spanning tree is generated.

Figure 18:
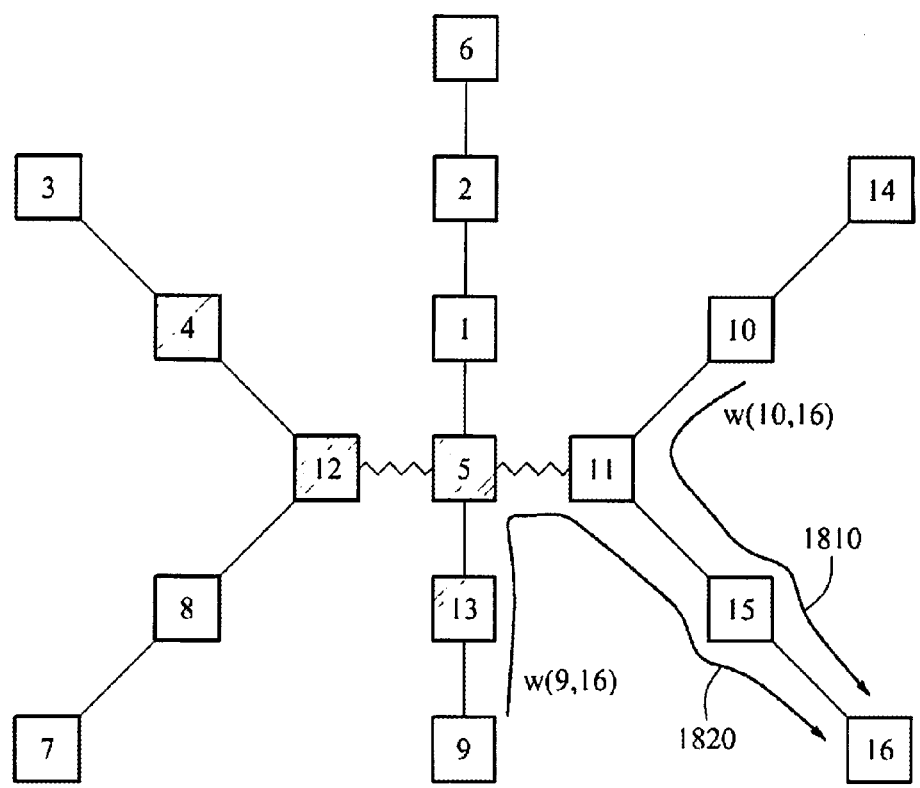

As another example, referring to FIG. 18, w(10, 16) may have a sufficiently smaller value than w(9, 16). By way of example, a sum of costs of edges present along a path 1810 from a pixel 10 to a pixel 16 may be sufficiently smaller than a sum of costs of edges present along a path 1820 from a pixel 9 to the pixel 16. An edge connecting a pixel 5 and a pixel 11 exists along the path 1820 from the pixel 9 to the pixel 16 because the edge connecting the pixel 5 and the pixel 11 is an edge penalized when the spanning tree is generated.

Referring to Equation 15, when $\overline{D}_v(0), \ldots, \overline{D}_v(d_{max})$ is calculated for each of the candidate disparity information $d \in \{0, \ldots, d_{max}\}$, candidate disparity information $d_v^*$ that allows an accumulated data cost to be a minimum is determined to be disparity information of a pixel v.

$$d_v^* = \underset{0 \leq d \leq d_{max}}{\operatorname{argmin}} \overline{D}_v(d) \qquad \text{[Equation 15]}$$

Up-Sampling According to Example Embodiments

The method for stereo matching using the spanning tree according to example embodiments may be adopted for a method for up-sampling. Referring to FIG. 3, when a high resolution color image and a low resolution depth image are provided, pixels of the color image corresponding to pixels of the depth image may be reference pixels that further include depth information.

A spanning tree that covers a whole of the image 300 may be generated in the same manner as described in the foregoing. Sub-trees may be generated based on the reference pixels, and the spanning tree may be generated by connecting roots of the sub-trees.

Hereinafter, a data cost for up-sampling of the depth image will be described. For example, a data cost of a "non-gcp" pixel may be set to "0". A data cost of a "gcp" pixel may be defined in a form of a histogram as represented by Equations 16 and 17.

$$D_v(d) := \kappa_v G_v(d) \qquad \text{[Equation 16]}$$

$$G_v(d) = \exp\left(-\frac{(d - d_v)^2}{2\sigma_d^2}\right) \qquad \text{[Equation 17]}$$

In Equations 16 and 17, $D_v(d)$ denotes a data cost of a "gcp" pixel v, and $\kappa_v$ and $\sigma_d$ denote parameters for data costs. $d_v$ denotes depth information pre-provided to the "gcp" pixel v. $\overline{D}_v(0), \ldots, \overline{D}_v(d_{max})$ for each of the candidate depth information $d \in \{0, \ldots, d_{max}\}$ may be calculated based on Equations 13 and 14. Referring to Equation 18, candidate depth information $d_v^*$ that allows an accumulated data cost to be a maximum is determined to be depth information of a pixel v.

$$d_v^* = \underset{0 \leq d \leq d_{max}}{\operatorname{argmax}} \overline{D}_v(d) \qquad \text{[Equation 18]}$$

Referring to FIG. 3, a resolution of the depth image may increase by a degree of a resolution of the color image based on the aforementioned method for up-sampling. As used herein, the method for up-sampling of the depth image may be referred to as depth map up-sampling.

Generation of Reference Pixel According to Example Embodiments

Figure 19:
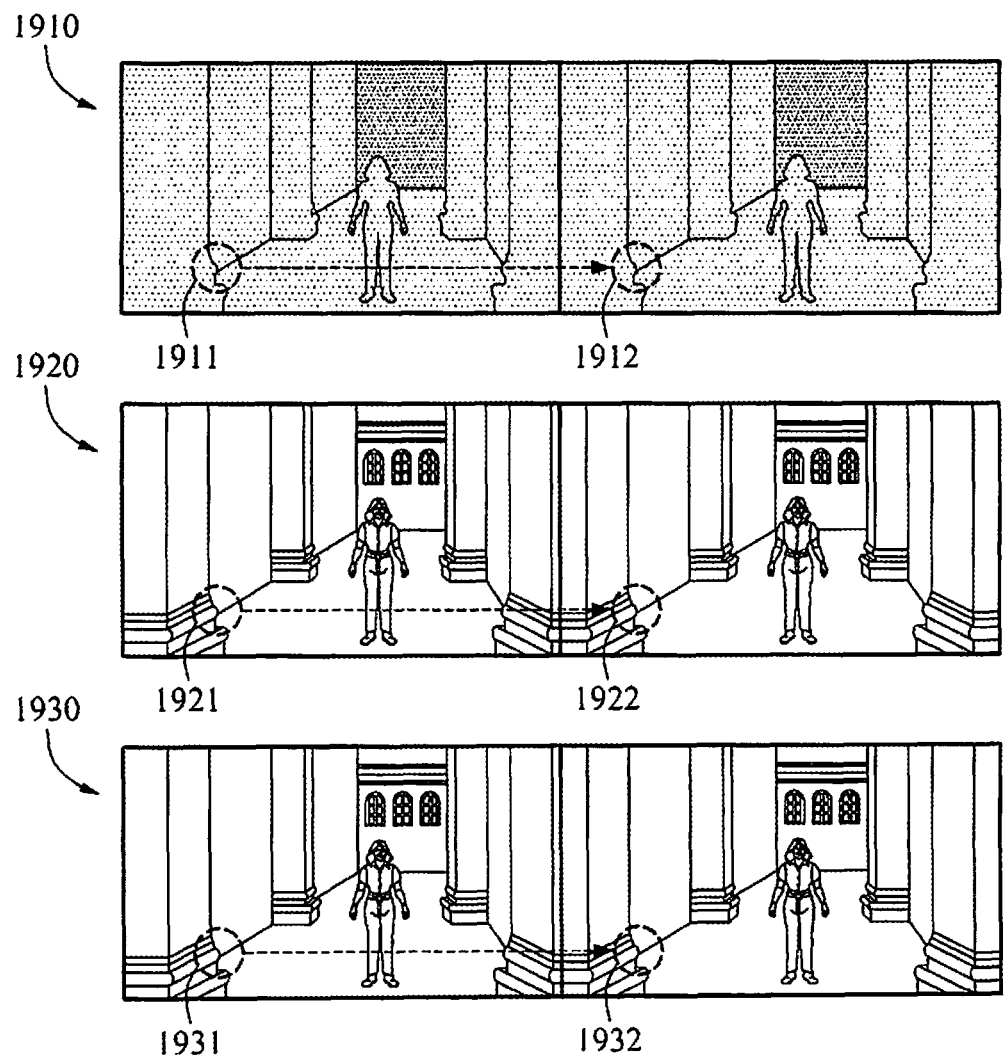
FIGS. 19 and 20 illustrate generation of a reference pixel using a stereo video according to example embodiments.
Figure 20:
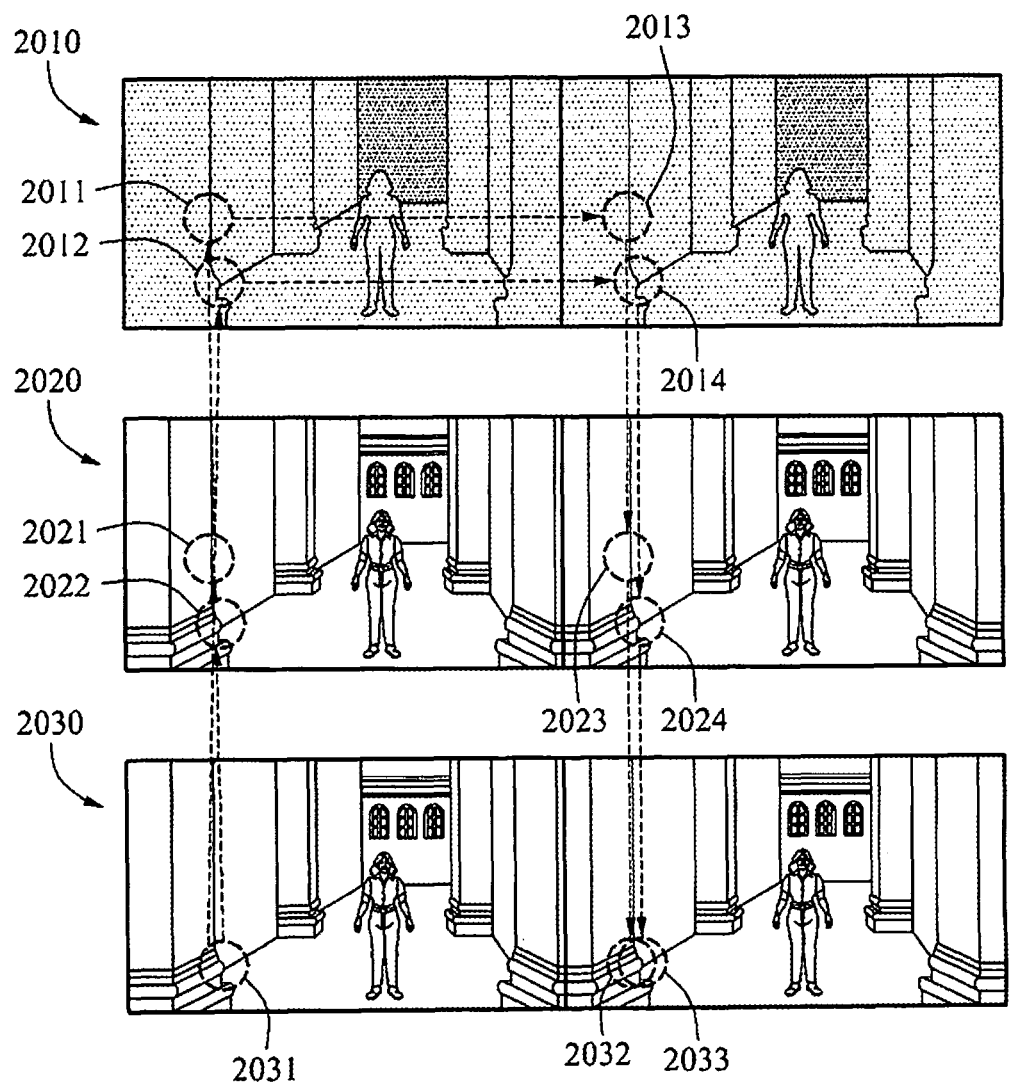

FIGS. 19 and 20 illustrate generation of a reference pixel using a stereo video according to example embodiments. The reference pixel according to example embodiments may be extracted from the stereo video.

The stereo video may include a series of stereo images. The stereo video may include a first image sequence corresponding to a left eye and a second image sequence corresponding to a right eye. An optical flow or a feature vector may be tracked from each of the first image sequence and the second image sequence. A highly reliable optical flow or a feature vector may be detected from a result of the tracking. The optical flow or the feature vector for each of the first image sequence and the second image sequence may have a corresponding relationship between frames in a time axis direction.

Referring to FIG. 19, an image 1920 is a stereo image of a previous frame, and an image 1930 is a stereo image of a current frame. An image 1910 is an image generated as a result of stereo matching of the image 1920 in the previous frame. As used herein, the image 1910 may be referred to as a disparity map. The disparity map is an image of which brightness varies based on an intensity of disparity information. For example, brightness of a pixel having a small disparity may be set to be dark, and brightness of a pixel having a large disparity, may be set to be bright.

When it is assumed that stereo matching is performed in a previous frame, and tracking is performed from the previous frame to a current frame, reference pixels of the current frame may be generated. For example, disparity information of a pixel 1931 included in a left image in the image 1930 of the current frame may be calculated based on a result of the tracking and a result of the stereo matching in the previous frame. In this example, the pixel 1931 may be a reference pixel.

By way of example, the pixel 1931 included in the left image of the current frame corresponds to a pixel 1921 included in a left image of the previous frame based on a result of tracking of the first image sequence. The pixel 1921 matches a pixel 1922 based on a result of stereo matching in the previous frame. In this example, a relationship between the pixel 1921 and the pixel 1922 may be represented by Equation 19.

$$x_r^{t-1} = x_l^{t-1} - d_l^{t-1} \quad \text{[Equation 19]}$$

In Equation 19, $x_r^{t-1}$ denotes an x axis coordinate value of the pixel 1922 or an x axis coordinate value of a pixel 1912 in a disparity map corresponding to the pixel 1922. $x_l^{t-1}$ denotes an x axis coordinate value of the pixel 1921 or an x axis coordinate value of a pixel 1911 in a disparity map corresponding to the pixel 1921. $d_l^{t-1}$ denotes disparity information of the pixel 1921.

The pixel 1922 included in a right image of the previous frame corresponds to a pixel 1932 included in a right image of the current frame based on a result of tracking of the second image sequence. The pixel 1931 matches the pixel 1932 because the pixel 1931 matches the pixel 1921, the pixel 1921 matches the pixel 1922, and the pixel 1922 matches the pixel 1932. Accordingly, disparity information of the pixel 1931 may be calculated based on Equation 20.

$$d_l^t = x_l^t - x_r^t \quad \text{[Equation 20]}$$

In Equation 20, $d_l^t$ denotes disparity information of the pixel 1931, $x_l^t$ denotes an x axis coordinate value of the pixel 1931, and $x_r^t$ denotes an x axis coordinate value of the pixel 1932. The pixel 1931 may be used as a reference pixel because the disparity information of the pixel 1931 is calculated based on Equation 20.

The data cost for stereo matching may be given by Equations 10 and 11 as described in the preceding. A data cost Gv(d) of a reference pixel may be referred to as a temporal prior.

Referring to FIG. 20, a reference pixel may be generated in a current frame although a result of tracking an optical flow or a feature vector is not fully reliable. An image 2020 is a stereo image of a previous frame, and an image 2030 is a stereo image of a current frame. An image 2010 is an image generated as a result of stereo matching of the image 2020 in the previous frame.

When a result of tracking is not completely reliable although the tracking is performed from the previous frame to the current frame, a single pixel in the current frame may correspond to a plurality of pixels in the previous frame. For example, a pixel 2031 included in a left image of the current frame corresponds to a pixel 2021 and a pixel 2022 included in a left image of the previous frame based on a result of tracking a first image sequence.

The pixel 2021 matches a pixel 2023, and the pixel 2022 matches a pixel 2024 as a result of stereo matching in the previous frame. Alternatively, a pixel 2011 in a left disparity map corresponding to the pixel 2021 matches a pixel 2013 in a right disparity map, and a pixel 2012 in the left disparity map corresponding to the pixel 2022 matches a pixel 2014 in the right disparity map.

The pixel 2023 and the pixel 2024 included in a right image of the previous frame correspond to a plurality of pixels included in a right image of the current frame based on a result of tracking a second image sequence.

As an example, a pixel matching the pixel 2031 may be determined based on at least one of a reliability of a result of the tracking of the first image sequence and a reliability of a result of the tracking of the second image sequence. By way of example, a most reliable pixel corresponding to the pixel 2031 from among the plurality of pixels in the previous frame may be selected based on the result of the tracking of the first image sequence. A reliability of the plurality of pixels corresponding to the pixel 2031 in the previous frame may be calculated based on a similarity to the pixel 2031. The similarity to the pixel 2031 may be calculated based on position information and/or intensity information of a pixel. The similarity to the pixel 2031 may be calculated based on a similarity of a patch including the pixel 2031.

When the selected pixel is assumed to be the pixel 2022, the pixel 2022 may correspond to the pixel 2024 based on a result of stereo matching in the previous frame. The pixel 2024 may correspond to a pixel 2032 and a pixel 2033 in the current frame. In this example, any one of the pixels may be selected based on the reliability of the result of the tracking of the second image sequence. A reliability of the plurality of pixels of the current frame corresponding to the pixel 2024 may be calculated based on a similarity to the pixel 2024. The similarity to the pixel 2024 may be calculated based on position information and/or intensity information of a pixel. The similarity to the pixel 2024 may be calculated based on a similarity of a patch including the pixel 2024.

When the selected pixel is assumed to be the pixel 2033, the pixel 2031 may match the pixel 2033. In this example, disparity information of the pixel 2031 may be calculated based on a difference between an x axis coordinate value of the pixel 2031 and an x axis coordinate value of the pixel 2033.

As another example, a function for a data cost may be determined based on at least one of the reliability of the result of the tracking of the first image sequence and the reliability of the result of the tracking of the second image sequence. By way of example, a data cost corresponding to candidate disparity information d in a pixel v in the current frame may be represented by Equation 21.

$$G_v(d) = g(d; \text{patchsimilarity}) \quad \text{[Equation 21]}$$

In Equation 21, g(d; patchsimilarity) denotes a function in which the higher the reliability of the result of the tracking of the first image sequence and the reliability of the result of the tracking of the second image sequence are, the smaller a value of the function.

For example, a pixel v is assumed to be spaced by a distance of the candidate disparity information d from the x axis coordinate value of the pixel v in the right image of the current frame to calculate disparity information of the pixel v in the left image of the current frame. The pixel v in the left image of the current frame may correspond to a pixel v' in the left image of the previous frame, the pixel v' in the left image of the previous frame may correspond to a pixel u' in the right image of the previous frame, and the pixel u' in the right image of the previous frame may correspond to the pixel u in the right image of the current frame. In this example, the reliability of the result of the tracking of the first image sequence corresponds to a reliability of a corresponding pair (pixel v, pixel v'), and the reliability of the result of the tracking of the second image sequence corresponds to a reliability of a corresponding pair (pixel u', pixel u).

A data cost for stereo matching may be given by Equations 10 and 21 as described in the preceding. A data cost Gv(d) of a reference pixel may be referred to as a temporal prior.

This disclosure may, however, be embodied in many different forms of combination and application, and should not be construed as limited to the example embodiments set forth herein. For example, when stereo matching with respect to a first frame of a stereo video is completed, stereo matching of subsequent frames may be performed in a combination of the aforementioned example embodiments.

By way of example, reference pixel information of a second frame may be generated using stereo matching information of the first frame based on the method of generating the reference pixel according to example embodiments. A spanning tree for the second frame may be generated using the reference pixel information of the second frame based on the method of generating the spanning tree according to example embodiments. Stereo matching for the second frame may be performed using the spanning tree for the second frame based on the method for stereo matching according to example embodiments. The aforementioned processes may be applied to the subsequent frames.

Operation Flowchart Description According to Example Embodiments

Figure 21:
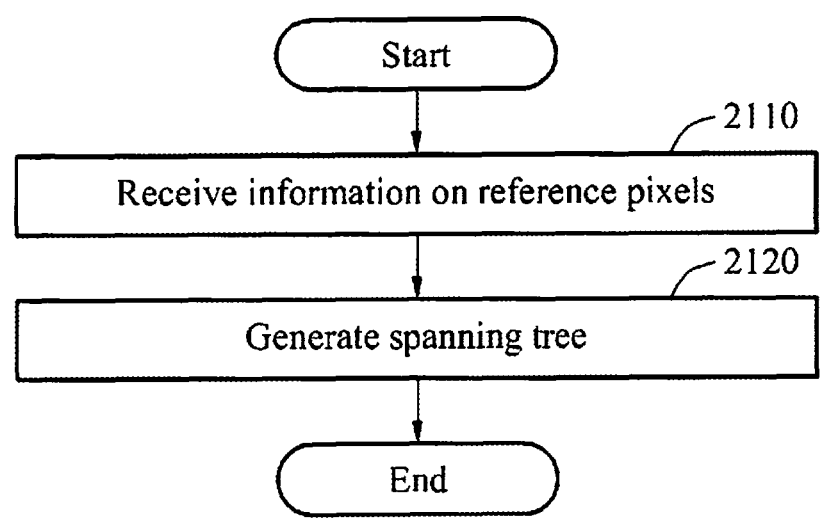
FIGS. 21 through 25 are flowcharts illustrating an operation according to example embodiments.

FIGS. 21 through 25 are flowcharts illustrating an operation according to example embodiments. Referring to FIG. 21, a method of generating a spanning tree according to example embodiments includes receiving information on reference pixels for an input image in 2110, and generating a spanning tree connecting pixels included in the input image based on the information on the reference pixels in 2120.

Figure 22:
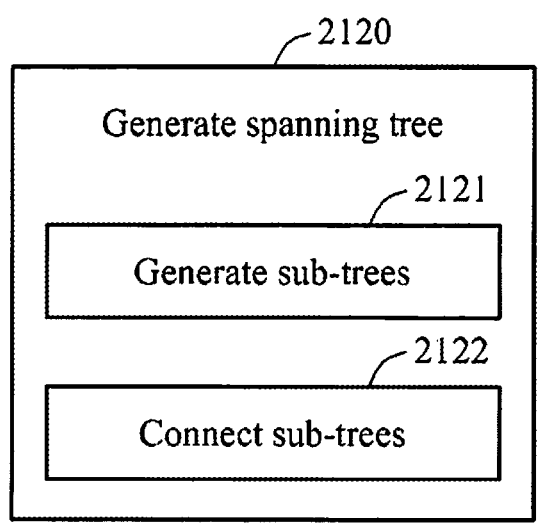

Referring to FIG. 22, the generating of the spanning tree in 2120 includes generating sub-trees to allow the reference pixels to be root nodes in 2121, and connecting the sub-trees by adjusting edge costs between the sub-trees in 2122.

Figure 23:
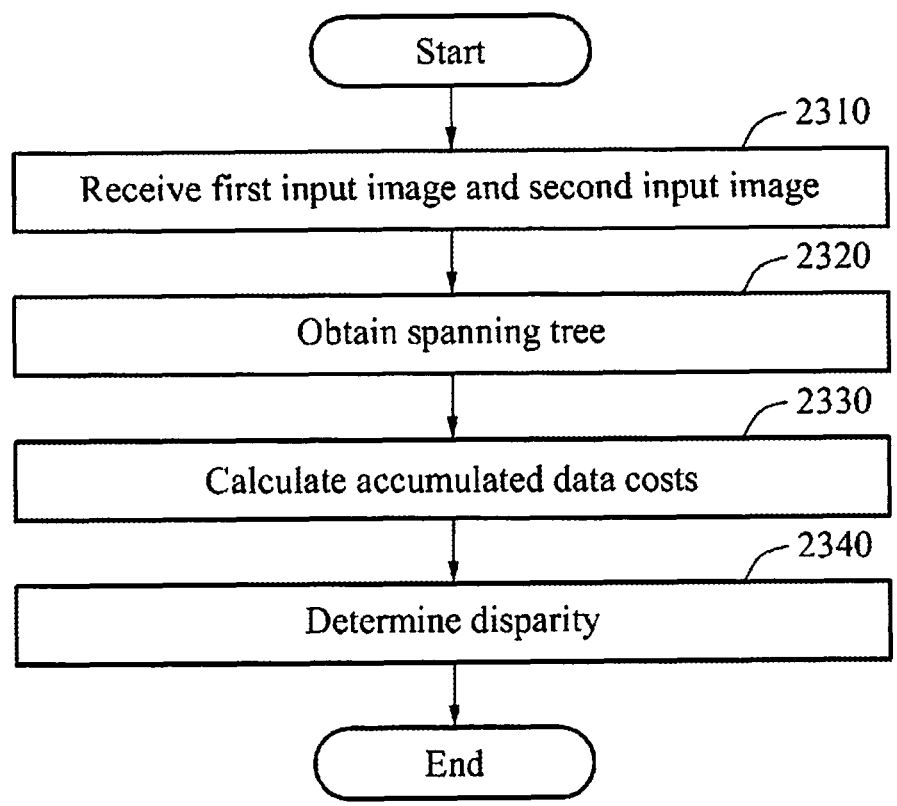

Referring to FIG. 23, a method for stereo matching according to example embodiments includes receiving a first input image and a second input image for stereo matching in 2310, obtaining a spanning tree connecting pixels included in the first input image in 2320, calculating accumulated data costs corresponding to a plurality of candidate disparities for any one of the pixels based on data costs of general pixels from among the pixels, data costs for reference pixels from among the pixels, and edge costs of edges included in the spanning tree in 2330, and determining one of the plurality of candidate disparities to be a disparity of one of the pixels by comparing the accumulated data costs in 2340.

Figure 24:
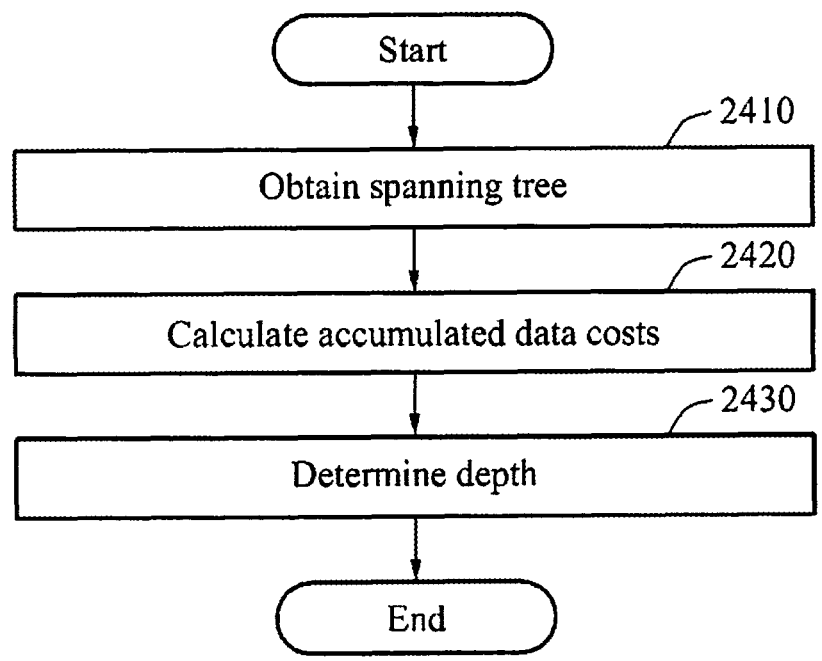

Referring to FIG. 24, a method for up-sampling according to example embodiments includes obtaining a spanning tree connecting pixels included in an input image in 2410, calculating accumulated data costs corresponding to a plurality of candidate depths for any one of the pixels based on data costs of reference pixels from among the pixels and edge costs of edges included in the spanning tree in 2420, and determining one of the plurality of candidate depths to be a depth of one of the pixels by comparing the accumulated data costs in 2430.

Figure 25:
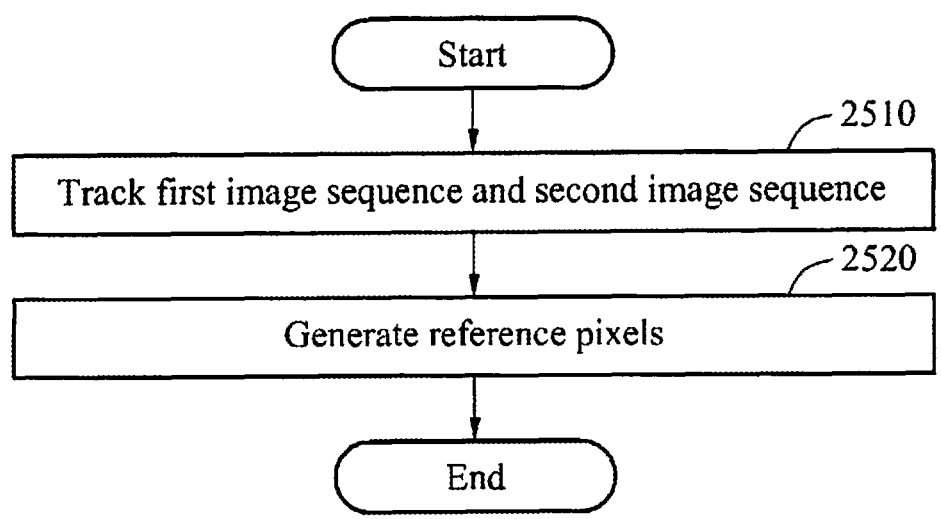

Referring to FIG. 25, a method of generating a reference pixel according to example embodiments includes tracking a first image sequence and a second image sequence included in a stereo video in 2510, and generating reference pixels for a current frame based on a result of the tracking of the first image sequence, a result of the tracking of the second image sequence, and a result of stereo matching in a previous frame in 2520.

For any descriptions of operations omitted in FIGS. 21 through 25, reference may be made to analogous features described in FIGS. 1 through 20.

Block Diagram Description According to Example Embodiments

Figure 26:
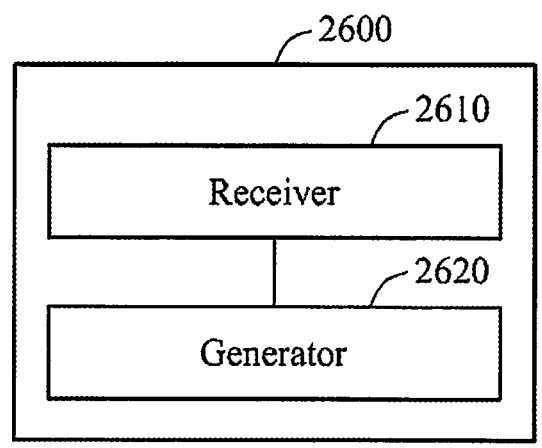
FIGS. 26 through 29 are block diagrams according to example embodiments.

FIGS. 26 through 29 are block diagrams according to example embodiments. Referring to FIG. 26, an apparatus 2600 for generating a spanning tree includes a receiver 2610 and a generator 2620. The receiver 2610 may receive information on reference pixels for an input image. The generator 2620 may generate a spanning tree connecting pixels included in the input image based on the information on the reference pixels. The receiver 2610 and the generator 2620 may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner.

Figure 27:
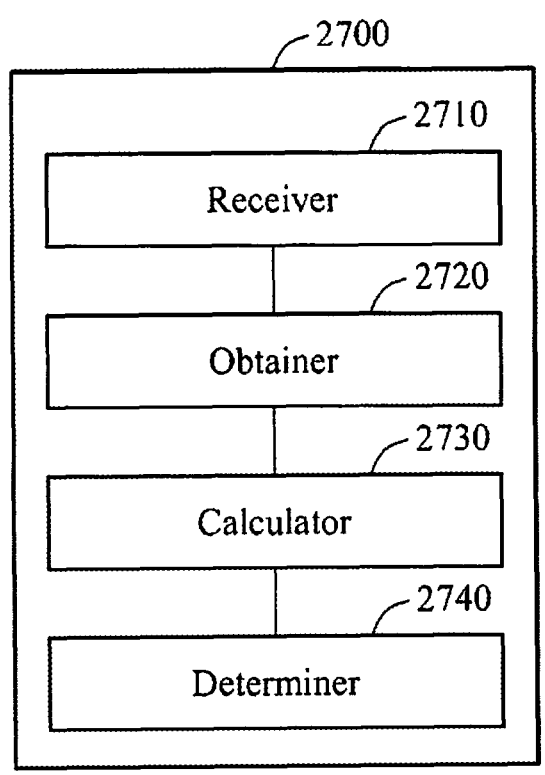

Referring to FIG. 27, an apparatus 2700 for stereo matching according to example embodiments includes a receiver 2710, an obtainer 2720, a calculator 2730, and a determiner 2740. The receiver 2710 may receive a first input image and a second input image for stereo matching. The obtainer 2720 may obtain a spanning tree connecting pixels included in the first input image. The calculator 2730 may calculate accumulated data costs corresponding to a plurality of candidate disparities for any one of the pixels based on data costs of general pixels from among the pixels, data costs for reference pixels from among the pixels, and edge costs of edges included in the spanning tree. The determiner 2740 may determine one of the plurality of candidate disparities to be a disparity of one of the pixels by comparing the accumulated data costs. The receiver 2710, the obtainer 2720, the calculator 2730, and the determiner 2740 may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner.

Figure 28:
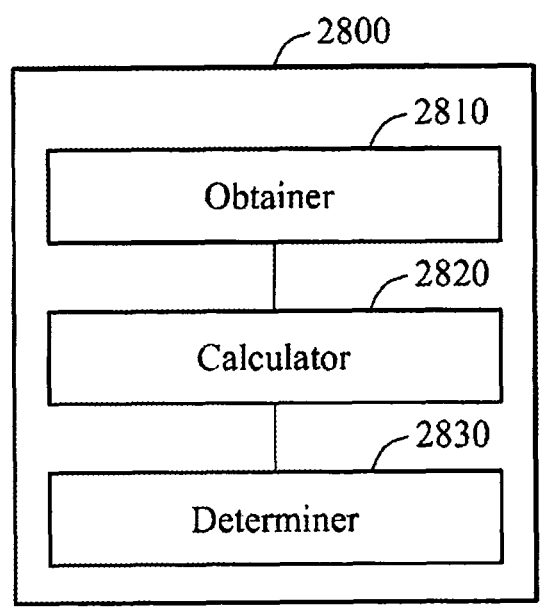

Referring to FIG. 28, an apparatus 2800 for up-sampling according to example embodiments includes an obtainer 2810, a calculator 2820, and a determiner 2830. The obtainer 2810 may obtain a spanning tree connecting pixels included in an input image. The calculator 2820 may calculate accumulated data costs corresponding to a plurality of candidate depths for any one of the pixels based on data costs of reference pixels from among the pixels and edge costs of edges included in the spanning tree. The determiner 2830 may determine one of the plurality of candidate depths to be a depth of one of the pixels by comparing the accumulated data costs. The obtainer 2810, the calculator 2820, and the determiner 2830 may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner.

Figure 29:
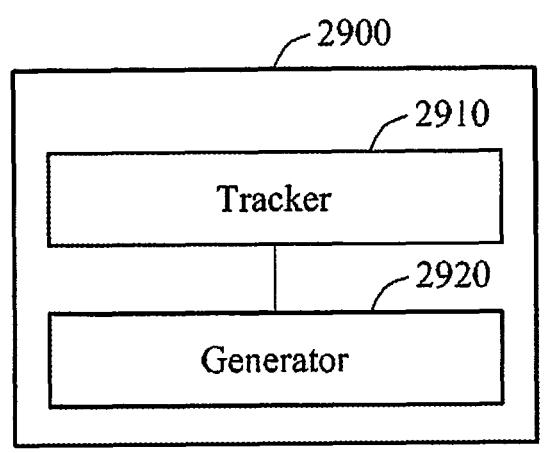

Referring to FIG. 29, an apparatus 2900 for generating a reference pixel according to example embodiments includes a tracker 2910 and a generator 2920. The tracker 2910 may track a first image sequence and a second image sequence included in a stereo video. The generator 2920 may generate reference pixels for a current frame based on a result of the tracking of the first image sequence, a result of the tracking of the second image sequence, and a result of stereo matching in a previous frame. The tracker 2910 and the generator 2920 may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner.

For any descriptions of modules omitted in FIGS. 26 through 29, reference may be made to analogous features described in FIGS. 1 through 20.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents. For example, proper results can be achieved although the described techniques are performed in an order different from the methods described or, and/or described system, architecture, device, circuit components such as the methods described in combination with or in combination with other types or other components or substituted or replaced by equivalents. Therefore, other implementations, other embodiments, and equivalents to appended claims will be described within the scope of the appended claims.

What is claimed is:

1. A method for stereo matching, the method comprising:
receiving a first input image and a second input image for stereo matching;
obtaining a spanning tree that connects pixels included in the first input image;
calculating accumulated data costs corresponding to a plurality of candidate disparities for one of the pixels based on data costs of general pixels from among the pixels, data costs of reference pixels from among the pixels, and edge costs of edges included in the spanning tree; and determining one of the plurality of candidate disparities to be a disparity of the one of the pixels by comparing the accumulated data costs.

2. The method of claim 1, further comprising:
receiving at least one of disparity information and depth information associated with the reference pixels.

3. The method of claim 1, further comprising:
receiving at least one of intensity information and position information associated with the general pixels and the reference pixels.

4. The method of claim 1, wherein the spanning tree comprises:
a plurality of sub-trees,
wherein each of the plurality of sub-trees includes pixels having a degree of correlation.

5. The method of claim 1, wherein a data cost of at least one of the general pixels is based on brightness information of the general pixel in the first input image and brightness information of a pixel spaced by a distance of one of the candidate disparities from a pixel corresponding to the general pixel in the second input image.

6. The method of claim 1, wherein a data cost of at least one of the reference pixels is based on disparity information of the reference pixel and a one of the candidate disparities.

7. The method of claim 6, wherein the data cost of the reference pixel is further based on brightness information of the reference pixel in the first input image and brightness information of a pixel spaced by one of the candidate disparities from a pixel corresponding to the reference pixel in the second input image.

8. The method of claim 1, wherein an accumulated data cost corresponding to one of the plurality of candidate disparities is calculated by calculating a weighted sum of data costs of pixels corresponding to the one of the plurality of candidate disparities.

9. The method of claim 8, wherein weights of the pixels for the weighted sum are based on edge costs corresponding to paths that connect any one pixel and remaining pixels from among the pixels in the spanning tree.

10. The method of claim 1, wherein the obtaining the spanning tree comprises:
receiving information associated with the reference pixels for the first input image; and
generating the spanning tree based on the information.

11. The method of claim 10, wherein the generating the spanning tree comprises:
generating sub-trees to allow the reference pixels to be root nodes; and
connecting the sub-trees by adjusting edge costs amongst the sub-trees.

12. The method of claim 11, wherein the generating the sub-trees comprises:
determining candidate pixel pairs based on the general pixels and reference pixels included in the first input image;
calculating edge costs of the candidate pixel pairs;
selecting one of the candidate pixel pairs sequentially based on values of the edge costs; and
determining whether to connect a first pixel and a second pixel based on a first sub-tree to which the first pixel included in the selected candidate pixel pair belongs and a second sub-tree to which the second pixel included in the selected candidate pixel pair belongs.

13. The method of claim 11, wherein the connecting of the sub-trees comprises:
determining candidate sub-tree pairs based on the sub-trees;
calculating edge costs of the candidate sub-tree pairs;
selecting a candidate sub-tree pair sequentially based on values of the edge costs; and
determining whether to connect a first sub-tree included in the selected candidate sub-tree pair and a second sub-tree included in the selected candidate sub-tree pair based on the first sub-tree and the second sub-tree.

14. A method for up-sampling, the method comprising:
obtaining a spanning tree that connects pixels included in an input image;
calculating accumulated data costs corresponding to a plurality of candidate depths for one of the pixels based on data costs of reference pixels from among the pixels and edge costs of edges included in the spanning tree; and
determining one of the plurality of candidate depths to be a depth of the one of the pixels by comparing the accumulated data costs.

15. The method of claim 14, further comprising:
receiving depth information, the depth information being exclusive to the reference pixels.

16. The method of claim 14, wherein the spanning tree comprises:
a plurality of sub-trees,
wherein each of the plurality of sub-trees includes pixels having a degree of correlation.

17. The method of claim 14, wherein a data cost of at least one of the reference pixels is based on depth information of the reference pixel and one of the candidate depths.

18. The method of claim 14, wherein an accumulated data cost corresponding to one of the plurality of candidate depths is calculated by calculating a weighted sum of data costs of pixels corresponding to the candidate depth.

19. The method of claim 18, wherein weights of the pixels for the weighted sum are based on edge costs corresponding to paths that connect any one pixel and remaining pixels from among the pixels in the spanning tree.

20. A non-transitory computer-readable medium comprising a program configured to instruct a computer to perform the method of claim 1.

* * * * *